(12) United States Patent
Young et al.

(10) Patent No.: US 8,628,440 B2
(45) Date of Patent: Jan. 14, 2014

(54) INVERTED TOOTH CHAIN AND SPROCKET DRIVE SYSTEM WITH REDUCED MESHING IMPACT

(75) Inventors: James D. Young, Chesaning, MI (US); Darren J. Stewart, Howell, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 866 days.

(21) Appl. No.: 12/556,332

(22) Filed: Sep. 9, 2009

(65) Prior Publication Data

US 2010/0069187 A1    Mar. 18, 2010

Related U.S. Application Data

(60) Provisional application No. 61/095,393, filed on Sep. 9, 2008.

(51) Int. Cl.
*F16H 7/06* (2006.01)
*F16H 55/30* (2006.01)
*F16G 13/04* (2006.01)

(52) U.S. Cl.
USPC ............................ 474/157; 474/152; 474/213

(58) Field of Classification Search
USPC ................................ 474/152, 157, 212, 213
See application file for complete search history.

(56) References Cited

U.S. PATENT DOCUMENTS

| | | |
|---|---|---|
| 1,598,906 A | 9/1926 | Dull |
| 1,693,431 A | 11/1928 | Behning |
| 3,377,875 A | 4/1968 | Sand |
| 3,495,468 A | 2/1970 | Griffel |
| 3,535,871 A | 10/1970 | Jeffrey |

(Continued)

FOREIGN PATENT DOCUMENTS

| | | |
|---|---|---|
| CN | 2651514 Y | 10/2004 |
| CN | 2771564 Y | 4/2006 |

(Continued)

OTHER PUBLICATIONS

International Preliminary Report on patentability mailed Mar. 24, 2011 for International application No. PCT/US2009/056364.

(Continued)

*Primary Examiner* — William E Dondero
*Assistant Examiner* — Robert T Reese
(74) *Attorney, Agent, or Firm* — Fay Sharpe LLP

(57) ABSTRACT

An inverted tooth chain drive system defines a meshing contact angle Tau ($\tau$) between the tangent line TL and an initial contact reference line that passes through a controlling pin center and the initial contact location. A link plate entrance angle Beta ($\beta$) is defined between the initial contact reference line and an inside flank reference line that passes through an arc center of the inside flank radius and the initial contact location. A meshing impact angle Sigma ($\sigma$) is defined between the tangent line and the inside flank reference line such that $\sigma=\tau+\beta$, wherein $\beta \leq 9°$ and $\sigma \leq 34°$. The pressure angle of the sprocket tooth can be adjusted and the chain optimized such that $\beta \leq 7°$ and $\sigma \leq 31°$. The system thus provides a reduction of the link impact force $F_L$ and the resultant impact energy E. The inverted tooth chain, itself, defines a pitch P and an inside flank projection Lamda ($\lambda$) such that $0.007 \times P \leq \lambda \leq 0.017 \times P$ when said chain is pulled straight. The outside flanks include a chamfer to ensure that initial contact between the chain and sprocket is always on the leading inside flanks of the chain.

22 Claims, 22 Drawing Sheets

(56) References Cited

U.S. PATENT DOCUMENTS

| | | |
|---|---|---|
| 3,636,788 A | 1/1972 | Jeffrey |
| 4,168,634 A | 9/1979 | Griffel |
| 4,509,323 A | 4/1985 | Ledvina et al. |
| 4,509,937 A | 4/1985 | Ledvina et al. |
| 4,758,209 A | 7/1988 | Ledvina |
| 4,758,210 A | 7/1988 | Ledvina |
| 4,759,740 A | 7/1988 | Cradduck |
| 4,764,158 A | 8/1988 | Honda et al. |
| 4,832,668 A | 5/1989 | Ledvina et al. |
| 4,906,224 A | 3/1990 | Reber |
| 4,915,675 A | 4/1990 | Avramidis |
| 4,915,676 A | 4/1990 | Komeya |
| 5,154,674 A | 10/1992 | Avramidis et al. |
| 5,236,400 A | 8/1993 | Tsuyama |
| 5,267,910 A | 12/1993 | Maruyama et al. |
| 5,419,743 A | 5/1995 | Takeda et al. |
| 5,453,059 A | 9/1995 | Avramidis et al. |
| 5,464,374 A | 11/1995 | Mott |
| 5,628,702 A | 5/1997 | Kotera |
| 5,758,484 A | 6/1998 | Ledvina et al. |
| 5,803,854 A | 9/1998 | Tada et al. |
| 6,077,181 A | 6/2000 | Kanehira et al. |
| 6,112,510 A | 9/2000 | Ichikawa et al. |
| 6,155,944 A | 12/2000 | Matsuda |
| 6,155,945 A | 12/2000 | Matsuda |
| 6,159,122 A | 12/2000 | Kanehira et al. |
| 6,168,543 B1 | 1/2001 | Matsuda |
| 6,186,920 B1 | 2/2001 | Reber |
| 6,244,983 B1 | 6/2001 | Matsuda |
| 6,272,835 B1 | 8/2001 | Horie et al. |
| 6,325,735 B1 | 12/2001 | Kanehira et al. |
| 6,334,828 B1 | 1/2002 | Suzuki |
| 6,413,180 B1 | 7/2002 | Kanehira et al. |
| 6,416,436 B1 | 7/2002 | Kanehira et al. |
| 6,432,011 B1 | 8/2002 | Kanehira et al. |
| 6,450,910 B1 | 9/2002 | Matsumoto et al. |
| 6,461,263 B2 | 10/2002 | Suzuki et al. |
| 6,533,107 B2 | 3/2003 | Suzuki et al. |
| 6,533,691 B2 | 3/2003 | Horie et al. |
| 6,663,522 B2 | 12/2003 | Horie |
| 6,733,410 B2 | 5/2004 | Saito |
| 6,796,920 B2 | 9/2004 | Horie et al. |
| 2001/0007842 A1 | 7/2001 | Suzuki et al. |
| 2002/0045504 A1 | 4/2002 | Suzuki et al. |
| 2002/0058561 A1 | 5/2002 | Kanehira et al. |
| 2002/0119853 A1 | 8/2002 | Horie |
| 2002/0128101 A1 | 9/2002 | Baddaria |
| 2003/0027675 A1 | 2/2003 | Suzuki et al. |
| 2003/0045388 A1 | 3/2003 | Kotera |
| 2003/0064845 A1 | 4/2003 | Saito |
| 2003/0119614 A1 | 6/2003 | Saitoh |
| 2003/0125146 A1 | 7/2003 | Saitoh |
| 2004/0097314 A1 | 5/2004 | Kotera |
| 2004/0110591 A1 | 6/2004 | Kotera |
| 2004/0166978 A1 | 8/2004 | Matsuda et al. |
| 2006/0058141 A1 | 3/2006 | Young |
| 2006/0068959 A1 | 3/2006 | Young et al. |
| 2007/0142150 A1* | 6/2007 | Vietoris .................. 474/212 |
| 2007/0155564 A1 | 7/2007 | Ledvina et al. |
| 2008/0167151 A1 | 7/2008 | Yonehara et al. |
| 2008/0312017 A1 | 12/2008 | Young et al. |

FOREIGN PATENT DOCUMENTS

| | | |
|---|---|---|
| EP | 1 281 890 | 2/2003 |
| EP | 1 293 704 | 3/2003 |
| JP | 55-024203 | 2/1980 |
| JP | 56-150655 | 11/1981 |
| JP | H1-119964 | 8/1989 |
| JP | 2005-248969 | 9/2005 |
| WO | WO 2009/111219 | 9/2009 |

OTHER PUBLICATIONS

Notification of Related U.S. Appl. No. 13/043,932, filed Mar. 9, 2011.

International Search Report mailed Dec. 4, 2009 for International application No. PCT/US2009/056364.

Written Opinion mailed Dec. 4, 2009 for International application No. PCT/US2009/056364.

SAE Technical Paper Series, 2007-01-2297, Young, James D., "Inverted Tooth Chain Sprocket with Frequency-Modulated Meshing Features to Reduce Camshaft Drive Noise", May 2007.

SAE Technical Paper Series, 1999-01-1226, Wada, Masakazu et al., "Development of a Small Pitch Silent Chain for a Single-Stage Cam Drive System", Mar. 1999.

Huang, Chintien et al., "The Tooth Contact Analysis of Round Pin Jointed Silent Chains", ASME 2005 International Design Engineering Technical Conferences & Computers and Information in Engineering Conference, DETC2005-84065, Sep. 2005.

Bucknor, Norman Kenneth, "Kinematic and static force analysis of silent chain drives", Columbia University, 1991.

International Search Report mailed Dec. 16, 2010 for International application No. PCT/US2010/051609.

Written Opinion mailed Dec. 16, 2010 for International application No. PCT/US2010/051609.

Notification of Related U.S. Appl. No. 12/814,963, filed Jun. 14, 2010.

* cited by examiner

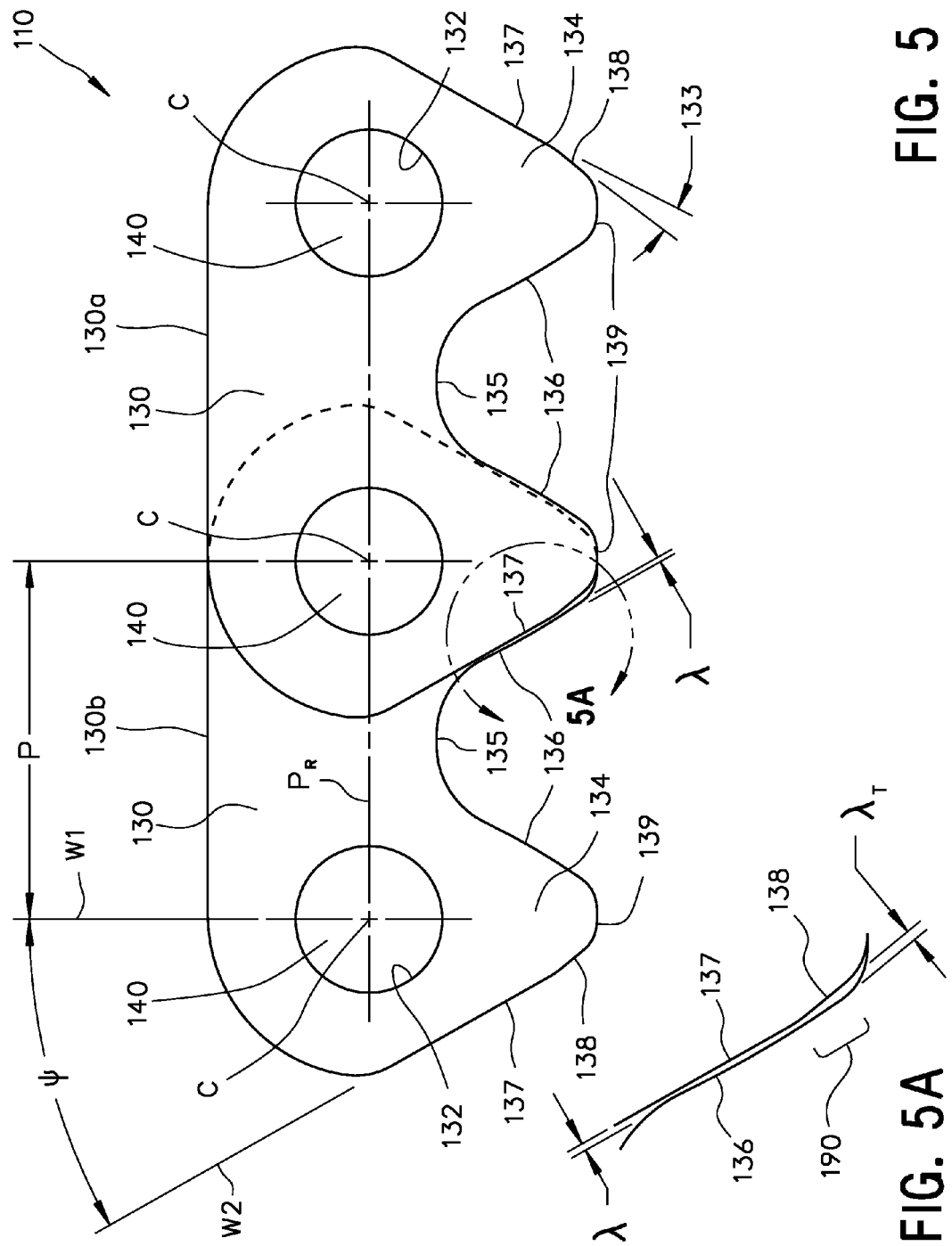

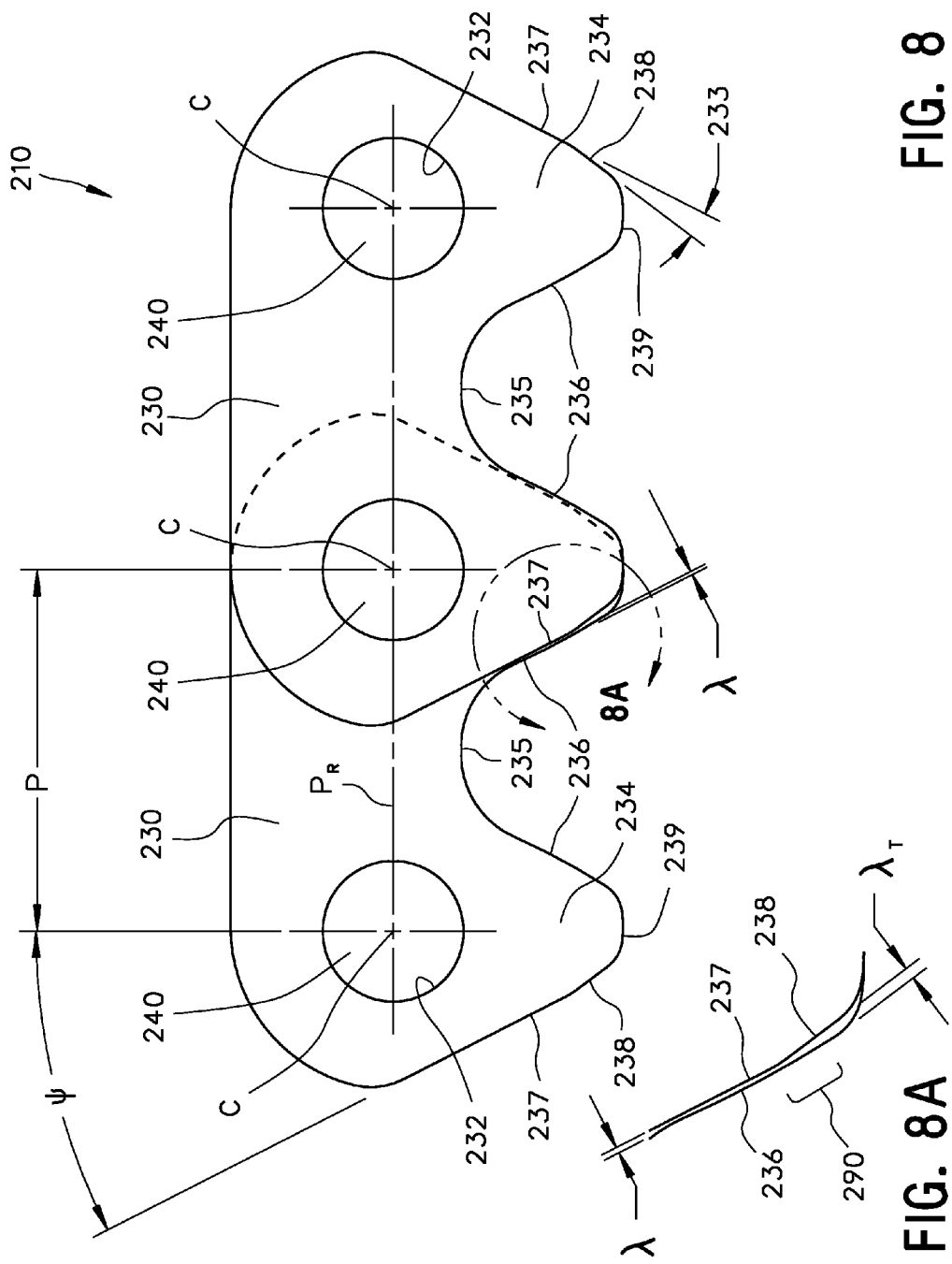

INVERTED TOOTH CHAIN AND SPROCKET DRIVE SYSTEM WITH REDUCED MESHING IMPACT

CROSS-REFERENCE TO RELATED APPLICATION

This application claims priority from and benefit of the filing date of U.S. provisional application Ser. No. 61/095,393 filed Sep. 9, 2008 (Sep. 9, 2008), and the entire disclosure of said prior provisional application Ser. No. 61/095,393 is hereby expressly incorporated by reference into the present specification.

BACKGROUND

Inverted tooth chains 10 have long been used to transmit power and motion between shafts in automotive applications and as shown in FIG. 1, they are conventionally constructed as endless chains with ranks or rows 30a,30b, etc. of interleaved link plates 30 each with a pair of teeth 34 having outside flanks 37, and inside flanks 36 between the teeth defining a crotch 35, and each having two apertures 32 that are aligned across a link row to receive connecting pins 40 (e.g., round pins, rocker joints, etc.) to join the rows pivotally and to provide articulation of the chain 10 about pin centers C as it drivingly engages the sprocket teeth either at the inside flanks ("inside flank engagement") or at the outside flanks ("outside flank engagement") of the link plates at the onset of meshing with the driving and driven sprockets. The pin centers C are spaced at a chain link pitch P. The term "pin centers C" is intended to encompass the axis of rotation of successive link rows 30a,30b relative to each other, regardless of whether the pins 40 comprise round pins, rocker joints or another suitable joint. The outside flanks 37 are straight-sided (but could be curved) and are defined by an outer or outside flank angle $\psi$. The inside flanks are convexly curved and comprise circular arc segments defined by a radius R centered at an arc center 79 (FIG. 3A).

Although both inside flank engagement and outside flank engagement meshing styles have been used for automotive engine timing drives, inside flank engagement is more common. Referring still to FIG. 1, inside flank meshing contact is facilitated by the outward projection $\lambda$ of the leading (in terms of chain movement direction) inside flank 36 of a link plate 30 with respect to the outside flank 37 of an adjacent link plate 30 in a preceding row 30a when the link rows 30a,30b are positioned in a straight line as would nominally be the case in the unsupported chain span at the onset of meshing with a sprocket.

Chain-sprocket impact at the onset of meshing is a dominant noise source in chain drive systems and it occurs as a chain link row exits the span and impacts with a sprocket tooth at engagement. The complex dynamic behavior of the meshing phenomenon is well known in the art and the magnitude of the chain-sprocket meshing impact is influenced by various factors, of which polygonal effect (referred to as "chordal action" or "chordal motion") is known to induce a transverse vibration in the "free" or unsupported span located upstream from the sprocket as the chain approaches the sprocket along a tangent line. Chordal motion occurs as the chain engages a sprocket tooth during meshing and it will cause chain motion in a direction perpendicular to the chain travel and in the same plane as the chain and sprockets. This undesirable oscillatory chain motion results in a velocity difference between the meshing chain link row and a sprocket tooth at the point of initial contact, thereby contributing to the severity of the chain-sprocket meshing impacts and the related chain engagement noise levels.

FIGS. 2A and 2B illustrate the chordal rise for a sprocket in which chordal rise CR is conventionally defined as the vertical displacement of a chain pin center C (or other chain joint) as it moves through an angle $\alpha/2$, where:

$$CR = r_p - r_c = r_p[1-\cos(180°/N)]$$

and where $r_c$ is the chordal radius or the distance from the sprocket center to a sprocket pitch chord of length P, which is also equal to the chain pitch length; $r_p$ is the theoretical pitch radius of the sprocket, i.e., one-half of the pitch diameter PD; N is the number of sprocket teeth; and $\alpha$ is equal to the sprocket tooth angle or 360°/N. FIG. 2A shows the chain pin center C at a first position where it has just meshed with the sprocket and where it is simultaneously aligned with both the tangent line TL and the sprocket pitch diameter PD. As is known in the art, and as used herein, the tangent line TL is the theoretical straight-line path along which the meshing chain pin centers C approach the sprocket. As shown herein, the tangent line TL is located in a horizontal orientation, in which case the tangent line TL is tangent to the pitch diameter PD at the top-dead-center or 12 o'clock position on the pitch diameter PD, i.e., the tangent line TL is tangent to the pitch diameter PD at a location where a chain pin center is centered on the pitch diameter PD and is also centered on a radial reference line that is normal to the tangent line TL (the reference line being vertical when the tangent line is horizontal as shown herein). FIG. 2B illustrates the location of the same pin center C after the sprocket has rotated through the angle $\alpha/2$, where it can be seen that the pin center C is transversely displaced by a distance CR as it continued its travel around the sprocket wrap, and this vertical displacement of the pin center results in a corresponding displacement of the upstream chain span and tangent line TL thereof. This transverse displacement of the chain pins C as they move through the chordal rise and fall serves to induce undesired vibration in the unsupported chain span.

One attempt to reduce undesired chordal motion of the chain is described in U.S. Pat. No. 6,533,691 to Horie et al. Horie et al. disclose an inverted tooth chain wherein the inside flanks of each link plate are defined with a compound radius profile intended to smooth the movement of the inside flanks from initial sprocket tooth meshing contact to the fully meshed (chordal) position. Initial meshing contact for the Horie et al link plate form occurs at a convexly arcuate portion of the inside flank at the link toe tip and proceeds smoothly and continuously to a second arcuate portion of the inside flank before transitioning to outside flank full meshing contact of a preceding link.

Chordal motion is also reduced in the system disclosed in published U.S. patent application No. 2006/0068959 by Young et al, where the prominence of the inside flanks of the chain relative to the respective outside flanks of adjacent link plates is defined as a function of the chain pitch P, and the maximum projection of the inside flank Lamda ($\lambda$) relative to the related outside flank is defined to fall in the range of $0.010 \times P \leq \lambda \leq 0.020 \times P$. Young et al disclose a link plate that also incorporates inside flank initial meshing contact to limit chordal motion, but its inside flank meshing contact begins and ends on the same convexly arcuate portion of the link plate before the meshing contact transitions to outside flank full meshing contact of a preceding link to complete the meshing cycle.

In U.S. Pat. No. 6,244,983, Matsuda discloses a link plate having inside flank meshing contact with the sprocket tooth for the full meshing cycle. Although the outside flanks of the Matsuda link plate do not contact the sprocket teeth, its inside flank meshing geometry serves to restrict chordal motion during engagement.

The above mentioned prior art inverted tooth chains all have features to beneficially limit chordal motion during meshing. However, another important factor to have an adverse influence on chain drive noise levels was not sufficiently considered in the link plate design for these chains—as well as for other prior art inverted tooth chains—and that factor is the meshing impact geometry during the chain-sprocket engagement process.

As shown in FIG. 3 and more clearly in FIG. 3A, a prior art chain link row 30c of chain 10 is at the onset of meshing with a sprocket tooth 60c of a conventional sprocket 50 in a chain drive system 15 including the chain 10, sprocket 50, and at least one other sprocket meshing with the chain 10. Reference will usually be made only to the individual chain link plates 30 visible in the foreground of each row 30a,30b,30c, etc., but those of ordinary skill in the art will recognize that the discussion applies to multiple link plates 30 across each row. Successive pin centers C are numbered C1, C2, C3, C4, etc. to distinguish them from each other.

The link row 30c is shown at the instant of initial meshing contact with a corresponding sprocket tooth 60c, i.e., at the instant of initial contact between the leading inside flank 36 of the chain link plate and the engaging flank 62c of the sprocket tooth 60c at an initial contact location IC on the engaging flank 62c. An initial contact angle Theta ($\theta$) is defined between a first radial reference line L1 originating at the axis of rotation of the sprocket and extending normal to the tangent line TL and a second radial reference line TC originating at the axis of rotation of the sprocket and extending through the tooth center of the subject sprocket tooth 60c. At the instant of initial meshing impact IC for link row 30c, the preceding link row 30b exits the chain span and enters a "suspended state", i.e., the link plates 30 of row 30b are not in direct contact with the sprocket 50 and are suspended between the meshing row 30c and a preceding row 30a that is in full meshing contact with a preceding sprocket tooth 60b. Link row 30b will remain in this suspended state as row 30c articulates through its sliding contact with the engaging flank 62c of sprocket tooth 60c from its initial meshing contact location IC to a final inside flank meshing contact location IF, at which time row 30b completes its meshing cycle and transitions into a position where its trailing outside flanks 37 make full meshing contact at location OF with sprocket tooth 60c (contact locations IF and OF are shown in FIGS. 4 and 4A). FIGS. 4 and 4A show the point in the meshing cycle referred to as "simultaneous meshing" in that link rows 30b and 30c are in simultaneous contact with sprocket tooth 60c, and with the next increment of sprocket rotation, link row 30c will separate from its inside flank meshing contact. Upon separation, link row 30c remains in the span, and it will enter the suspended state at the instant of initial meshing impact IC for a following row 30d with sprocket tooth 60d.

It should be noted that prior to the instant of initial meshing impact for link row 30c (referring again to FIGS. 3 and 3A), the chain span effectively rotates about pin center C1 as row 30c articulates toward meshing impact IC with the sprocket tooth 60c. Thus, the pin center C1 can be referred to as the "controlling pin center." The controlling pin center C1 is the closest preceding (downstream) pin center relative to the leading pin center C2 of the meshing link row 30c (the controlling pin center C1 is also the trailing pin center of the closest (in terms of chain travel direction) fully meshed link row 30a). As such, the following relationships are defined:

a meshing contact angle Tau ($\tau$) is defined between the tangent line TL and an initial contact reference line 70 that passes through both the controlling pin center C1 and the initial contact location IC;

the initial contact reference line 70 defines a length L lever arm (FIG. 3A) between the controlling pin center C1 and the initial contact location IC;

a link plate entrance angle Beta ($\beta$) is defined between the initial contact reference line 70 and an inside flank reference line 74 that passes through the arc center 79 of the inside flank radius R and the initial contact location IC (the inside flank reference line 74 will be normal to the involute curve (or radial arc segment or other curved surface) of the engaging flank 62c of the sprocket tooth 60c;

a meshing impact angle Sigma ($\sigma$) is defined between the tangent line TL and the inside flank reference line 74, i.e., $\sigma = \tau + \beta$.

Chain-sprocket meshing impact results from a velocity difference between the meshing link row 30c and a sprocket tooth 60c at the initial contact location IC, and the related impact energy E generated as the sprocket tooth collects the meshing link row 30c from the chain span at the instant of initial meshing impact is defined by the equation:

$$E = C \times m \times L^2 \times \omega^2 \times \cos^2(90 - \beta)$$

where C is a constant, m is equal to the mass of the single meshing link row 30c, L is the length from the controlling pin center C1 to the initial contact location IC, $\omega$ is the angular velocity of the sprocket, and $\beta$ is the link plate meshing entrance angle. The meshing impacts along with the associated noise levels can be reduced by decreasing the velocity difference, which can be accomplished by reducing the meshing entrance angle $\beta$.

In addition, the impact energy E equation considers only the mass of the meshing link row 30c, and it does not take into account chain tension $T_C$ and this chain tension will add to the resultant meshing impact energy E and the associated overall noise levels. The chain tension $T_C$ will act on the sprocket tooth 60c at the onset of meshing and the tooth impact reaction force $F_S$, equal and opposite to a link impact force $F_L$, will vary with the magnitude of the meshing impact angle $\sigma$, where:

$$F_S = \frac{F_H}{\cos\sigma}$$

and where $F_H$ will be equal to $T_C$ in order to satisfy the summation of horizontal forces being equal to zero. These relationships are shown in FIGS. 3 and 3A (note that in FIG. 3A, the meshing impact angle Sigma ($\sigma$) and its component angles are shown relative to a reference line 72 that is parallel to the tangent line TL and extending through the initial contact location IC, coincident with the force vector $F_H$). It should be noted that the sprocket tooth 60c, along with the next several teeth forward (downstream) of tooth 60c, share in the load distribution of the chain tension $T_C$ with the largest reaction force $F_H$ occurring at location IC of tooth 60c at the onset of initial meshing contact. The remaining portion of the chain tension loading acting on the several teeth forward of tooth 60c does not influence the meshing noise levels and is therefore not a consideration for this present development. To summarize, the link impact force vector $F_L$ acts at the meshing impact location IC during initial meshing contact and adds to the total meshing impact energy E and the related noise levels.

As described above, FIG. 4 shows simultaneous meshing contact, where the leading inside flanks 36 of link row 30c are contacting the engaging flank 62c of sprocket tooth 60c at location IF, and the trailing outside flanks 37 of preceding link row 30b are contacting the engaging flank 62c are location OF. FIG. 4A is a greatly enlarged partial view of FIG. 4 that also shows the forces resulting from the geometry of the simultaneous meshing contact phenomenon. This instant at which the tooth 60c transitions from "inside flank only" contact with leading inside flanks 36 of link row 30c to achieve simultaneous outside flank contact with trailing outside flanks 37 of preceding link row 30b can also be referred to as a transition point, and also defines the end of the meshing cycle for the tooth 60c, because the link row 30b is now fully meshed with both its leading and trailing pin centers C1,C2 located on the pitch diameter PD. A transition angle Phi ($\phi$) is defined between the first radial reference line L1 and the second radial reference line TC marking the tooth center of tooth 60c.

FIGS. 4 and 4A correspond respectively to FIGS. 3 and 3A, but relate to the transition phenomenon, and show that:

a transition contact angle Tau' ($\tau'$) is defined between the tangent line TL and a transition contact reference line 80 that passes through both the outside flank contact location OF and the controlling pin center C1 which, for the transition phenomenon, is the leading pin center of the link row transitioning to trailing outside flank contact at location OF (or the pin center C that is immediately preceding the pin center at the interface between the simultaneously meshing link rows);

the transition contact reference line 80 defines a length L' lever arm between the controlling pin center C1 and the outside flank contact location OF;

a link plate transition angle Beta' ($\beta'$) is defined between the transition contact reference line 80 and a outside flank reference line 84 that extends normal to the trailing outside flank 37 (the outside flank reference line 84 will also be normal to the involute curve (or radial arc segment or other curved surface) of the engaging flank 62c of the sprocket tooth 60c;

a transition impact angle Sigma' ($\sigma'$) is defined between the tangent line TL and the outside flank reference line 84, i.e., $\sigma'=\tau'+\beta'$.

It should be noted that features in FIGS. 4 and 4A that correspond to features of FIGS. 3 and 3A are labeled with corresponding reference characters including a prime (') designation, and not all are discussed further. Also, in FIG. 4A, the transition impact angle Sigma' ($\sigma'$) and its constituents are shown relative to a reference line 82 that is parallel to the tangent line TL and extending through the outside flank contact location OF, coincident with the force vector $F'_H$.

The intensity of the secondary meshing impact and the related noise level as link row 30b transitions to full chordal meshing contact at location OF with sprocket tooth 60c is a smaller value as compared to the above-described initial meshing impact at location IC and its resulting meshing noise level. Firstly, the transition impact angle $\sigma'$ will always be a smaller value than the initial meshing impact angle $\sigma$. Secondly, the outside flank contact at location OF occurs as the link row 30b transitions from the suspended state to the fully meshed state, which is believed to be less significant in terms of impact force as compared to the initial contact between the chain 10 and sprocket 50, in which a link row is collected from the chain span to impact with a sprocket tooth 60 at the onset of meshing. In addition, noise and vibration testing has shown the transition meshing impact of the outside flank 37 at location OF to contribute less to the overall meshing noise levels than the initial meshing impact of the inside flank 36 at location IC.

The sprocket 50 is conventional and the teeth 60 (i.e., 60a, 60b, 60c, etc.) are each symmetrically defined about a radial tooth center TC to have an engaging flank 62 (i.e., 62a,62b, 62c, etc.) that makes initial contact with the chain 10 during meshing and a matching disengaging flank 64 (i.e., 64a,64b, 64c, etc.). The tooth centers TC bisect each tooth 60 and are evenly spaced in degrees (°) at a tooth angle $\alpha=360°/N$. The involute form of the engaging tooth flanks 62 (and disengaging flanks 64) is generated from a base circle and the base circle is defined as:

Base Circle=PD×COS(PA), where

PD=sprocket pitch diameter, and PA=tooth pressure angle Furthermore, the pitch diameter PD, itself, is defined as:

PD=P/SIN(180/N), where where P=pitch, and N=number of teeth in sprocket.

The involute tooth form can be approximated by a radial tooth form, and the pressure angle PA of a radial tooth form can likewise be determined. In any case, it is generally known that an engaging flank 62 defined with a smaller pressure angle is steeper (closer to a radial line originating at the sprocket axis of rotation) as compared to an engaging flank defined with a larger pressure angle. As such, a reference line tangent to the engaging flank 62 at the initial contact location IC will define an angle between itself and a radial reference line located between the engaging flank and the immediately downstream (leading) disengaging flank 64 that is smaller when the pressure angle decreased and that is larger when the pressure angle is increased. Prior art systems have not substantially altered the conventional sprocket tooth pressure angles to permit optimization of the design of the chain link plates 30 in order to minimize link impact force $F_L$ and the related impact energy E. Conventional sprocket pressure angles in degrees (°) are shown below in Table 1, and the sprocket 50 conforms to these conventions (all teeth 60 have the same pressure angle PA):

TABLE 1

| Sprocket Tooth Count (N) | Conventional Pressure Angle |
|---|---|
| <19 | 33° |
| 19-25 | 31.5° |
| 26-60 | 30° |

SUMMARY

In accordance with one aspect of the present development, a chain and sprocket drive system include a sprocket comprising a plurality of teeth, wherein each tooth comprises an engaging flank and a disengaging flank. An inverted tooth chain is meshed with the sprocket and includes a plurality of rows of links that each articulate relative to a preceding link row about a leading pin center and that each articulate relative to a following link row about a trailing pin center, wherein said leading and trailing pin centers are spaced from each other at a chain pitch P, each of said rows comprising leading inside flanks and trailing outside flanks. The leading inside flanks of each row project outwardly relative to a contact or working portion of the trailing outside flanks of a preceding row and comprise an inside flank radius R. The chain approaches the sprocket along a tangent line and the engaging flank of each sprocket tooth makes initial meshing contact with the chain at an initial contact location on the leading inside flanks of a meshing row of the chain at an instant of initial meshing contact. At the instant of initial meshing contact, a chain row immediately preceding the meshing row includes a leading pin center that is located on the pitch diameter so as to be a controlling pin center. For each row of the chain that is fully meshed with the sprocket, its leading and trailing pin centers are located on the pitch diameter PD and its trailing outside flanks are in contact with one of the engaging flanks. A meshing contact angle Tau ($\tau$) is defined between the tangent line TL and an initial contact reference line that passes through both the controlling pin center and the initial contact location. A link plate entrance angle Beta ($\beta$) is defined between the initial contact reference line and an inside flank reference line that passes through an arc center of the inside flank radius and the initial contact location. A meshing impact angle Sigma ($\sigma$) is defined between the tangent line and the inside flank reference line such that $\sigma=\tau+\beta$, and $\sigma$ is less than or equal to 34°.

In accordance with another aspect of the present development, an inverted tooth chain includes a plurality of rows of links that each articulate relative to a preceding row about a leading pin center and that each articulate relative to a following link row about a trailing pin center, wherein the leading and trailing pin centers are spaced from each other at a chain pitch P, each of the rows comprising leading inside flanks and trailing outside flanks, wherein the leading inside flanks of each row project outwardly relative to a working portion of the trailing outside flanks of a preceding row by a maximum projection amount Lamda ($\lambda$) such that $0.007 \times P \leq \lambda \leq 0.017 \times P$. The leading inside flanks of each row of the chain are defined by an inside flank radius R, wherein $P \leq R < 2 \times P$. The outside flank comprises a non-working portion comprising a chamfer located between the working portion and a toe tip for each of the links of the chain, wherein the leading inside flanks of an adjacent row of the chain project outwardly relative to the chamfer by a projection amount that is greater than the projection amount Lamda ($\lambda$) when the inverted tooth chain is pulled straight.

In accordance with another aspect of the present development, a sprocket adapted to mesh with an inverted tooth chain includes a plurality of teeth, wherein each tooth comprises an engaging flank and a disengaging flank. The engaging flank of each tooth is defined by a pressure angle PA that varies in magnitude based upon a tooth count N that defines a total number of the teeth included on the sprocket such that:

N=19 to 25, 28°≤PA≤29°
N=26 to 50, 27°≤PA<28°

In accordance with another aspect of the present development, an inverted tooth chain includes a plurality of rows of links that each articulate relative to a preceding row about a leading pin center and that each articulate relative to a following link row about a trailing pin center, wherein the leading and trailing pin centers are spaced from each other at a chain pitch P, each of the rows comprising leading inside flanks and trailing outside flanks, wherein:

the leading inside flanks of each row project outwardly relative to a straight working portion of the trailing outside flanks of a preceding row by a maximum projection amount Lamda ($\lambda$) such that $0.007 \times P \leq \lambda \leq 0.017 \times P$ when the chain is pulled straight;

the leading inside flanks of each row are defined by an inside flank radius R, wherein $P \leq R < 2 \times P$;

the outside flanks of each row comprises a non-working portion comprising a chamfer located between the working portion and a toe tip, wherein the leading inside flanks of an adjacent row of the chain project outwardly relative to the chamfer by a projection amount that is greater than the projection amount Lamda ($\lambda$) when said chain is pulled straight; and, the outside flanks define an outer flank angle $\psi \leq 30.5°$, the outer flank angle $\psi$ defined between: (i) a first reference line that includes the trailing pin center and that lies perpendicular a pin center reference line that connects the leading and trailing pin centers; (ii) a second reference line that is coincident with the straight working portion of said trailing outside flank.

BRIEF DESCRIPTION OF DRAWINGS

The invention comprises various components and arrangements of components, preferred embodiments of which are illustrated in the accompanying drawings wherein:

FIG. 5 shows first and second link rows of an inverted tooth chain formed in accordance with a first embodiment of the present development, with the guide plates removed to reveal the underlying link plates;

FIG. 5A is a greatly enlarged view of detail region 5A of FIG. 5;

FIG. 8 shows first and second link rows of an inverted tooth chain formed in accordance with a second embodiment of the present development, with the guide plates removed to reveal the underlying link plates;

FIG. 8A is a greatly enlarged view of detail region 8A of FIG. 8;

DETAILED DESCRIPTION

Figure 5B:
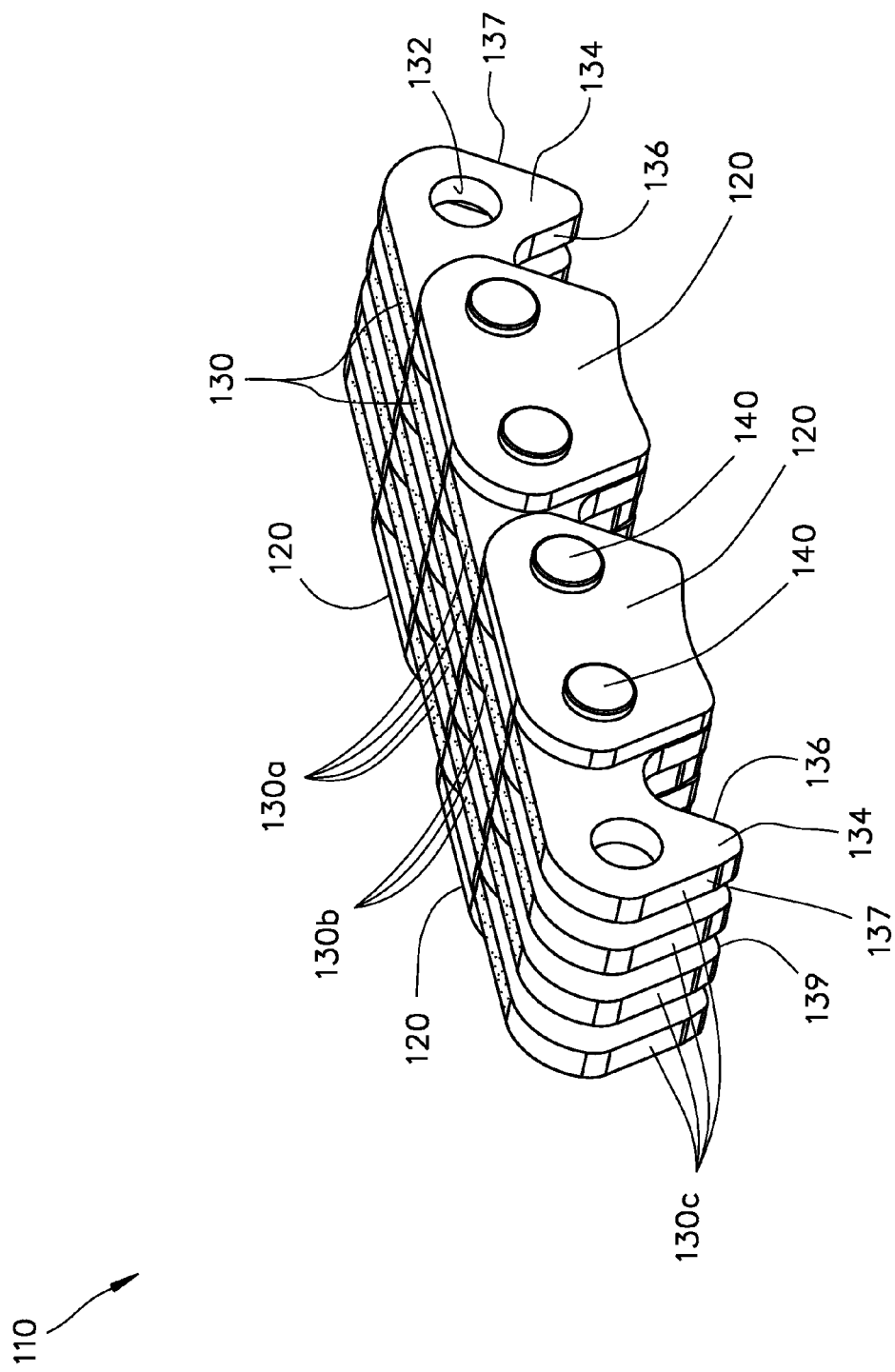
FIG. 5B is an isometric view of multiple link rows of the chain of FIG. 5 including guide plates.

FIG. 5 is an enlarged illustration of first and second rows of an inside flank engagement inverted tooth chain 110 formed in accordance with the present development (guide plates of the chain are not shown), showing a preferred inside flank projection Lamda ($\lambda$) and outside flank profile. FIG. 5A is an enlarged view of detail region 5A of FIG. 5 that illustrates the inside flank projection $\lambda_T$ relative to the outside flank chamfer 138 near the link tooth tips 139. FIG. 5B is an isometric view of a chain segment incorporating the link plates of FIG. 5 in accordance with the present invention to define the inverted tooth chain 110.

The chain 110 comprises ranks or rows 130a, 130b, 130c, etc. of interleaved inside links or link plates 130 each with a pair of teeth 134 having outside flanks 137, and inside flanks 136, with the inside flanks 136 of the teeth 134 defining a crotch 135 therebetween. The teeth 134 have respective toes or tips 139. Each link plate 130 comprises two apertures 132 that are aligned across a link row to receive connecting pins 140 (e.g., round pins, rocker joints, etc.) to join the rows pivotally and to provide articulation of the chain about pin centers C as it drivingly engages the sprocket teeth at the inside flanks 136 ("inside flank engagement") at the onset of meshing with a sprocket such as the conventional sprocket 50. The pin centers C are spaced from each other at a chain pitch length or link pitch P. The term "pin centers C" as used herein is intended to encompass the axis of rotation of successive link rows 130a, 130b, 130c relative to each other, regardless of whether the pins 140 comprise round pins, rocker joints or another suitable joint. First and second guide plates 120 (FIG. 5B) flank every other link row (the so-called "guide rows") and serve to align the chain 110 on a sprocket but do not mesh with the sprocket teeth (the guide plates 120 are not shown in most of the figures hereof in order to reveal the underlying link plates 130). The leading (in terms of chain movement direction) inside flanks 136 of each link row 130a, 130b, 130c project outward relative to the trailing outside flanks 137 of the preceding link row 130a, 130b, 130c by a projection amount $\lambda$ when the link rows are positioned in a straight line with all pin centers C aligned along the tangent line TL as would nominally be the case in the unsupported chain span at the onset of meshing with a sprocket such as the sprocket 50. As described in the background above, the tangent line TL is the theoretical straight-line path along which the meshing chain pin centers approach the sprocket. As shown herein, the tangent line TL is located in a horizontal orientation, in which case the tangent line TL is tangent to the pitch diameter PD at the top-dead-center or 12 o'clock position on the pitch diameter PD i.e., the tangent line TL is tangent to the pitch diameter PD at a location where a chain pin center is centered on the pitch diameter PD and is also centered on a radial reference line that is normal to the tangent line TL (the reference line being vertical when the tangent line is horizontal as shown herein).

Each link plate 130 is identical to the others and is symmetrical about a vertical plane arranged perpendicular to the link plate 130 midway between the pin centers C. The outside flanks 137 are straight-sided (but could be curved) and for this first embodiment, the outer or outside flank angle Psi ($\psi$) is defined by $30° < \psi \le 30.5°$, where $\psi$ is defined between a first reference line W1 that is perpendicular to a reference line $P_R$ connecting the pin centers C and a second reference line W2 coincident with the outside flank 137. The inside flanks 136 have a convexly arcuate form and the inside flanks will preferably project outwardly relative to the outside flanks of adjacent link rows by a projection amount Lamda ($\lambda$) to satisfy the relationship $0.007 \times P \le \lambda \le 0.017 \times P$ where P is equal to the chain pitch length. The inside flank 136 is preferably formed to satisfy the inequality:

$$P \approx R \le 2P$$

where R is the radius of curvature of the inside flank 136 and P is the chain pitch length. Each inside flank 136 is defined by a radial arc segment defined by the radius R centered at an arc center 179 (FIG. 6A) and that extends from the crotch 135 to the tip 139. The outside flanks 137 include a chamfer 138 of any desired angle adjacent the tip 139. The chamfer 138 assures that the initial meshing contact region 190 (see FIG. 5A) for a leading inside flank 136 will always project outwardly from the trailing outside flank 137 of the preceding link plate 130 at the onset of meshing by an amount $\lambda_T > \lambda$, particularly when the inside flank projection Lamda ($\lambda$) is at its lower manufacturing limit. As shown, the chamfer 138 is flat and defines a chamfer angle 133 between itself and the plane of the remainder of the outside flank 137. A smaller value for Lamda ($\lambda$) will beneficially provide a smaller angle Beta ($\beta$).

Figure 6:
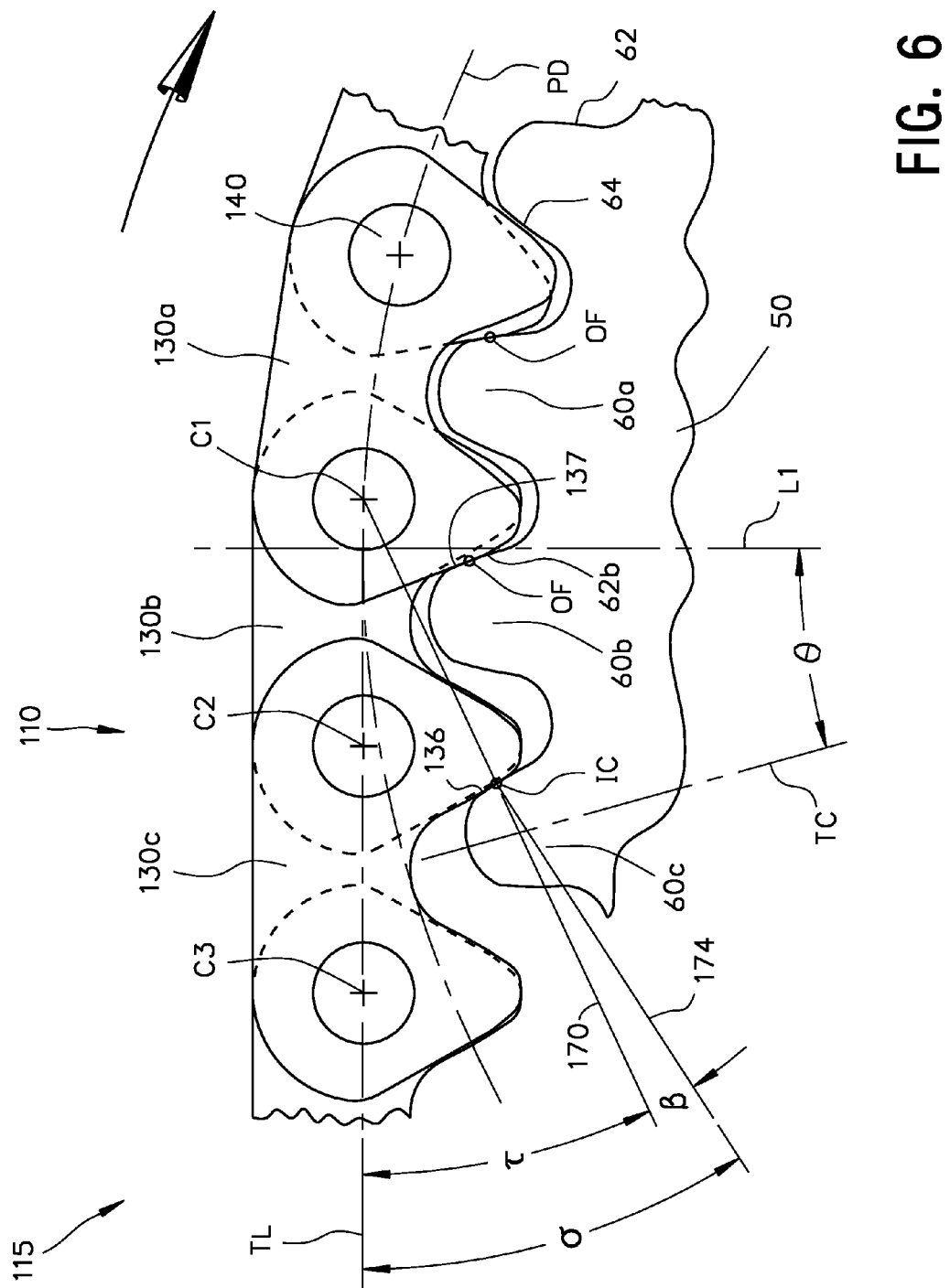
FIG. 6 shows the chain of FIG. 5 with a link row at the onset of meshing with a sprocket tooth of the conventional sprocket of FIG. 3.
Figure 6A:
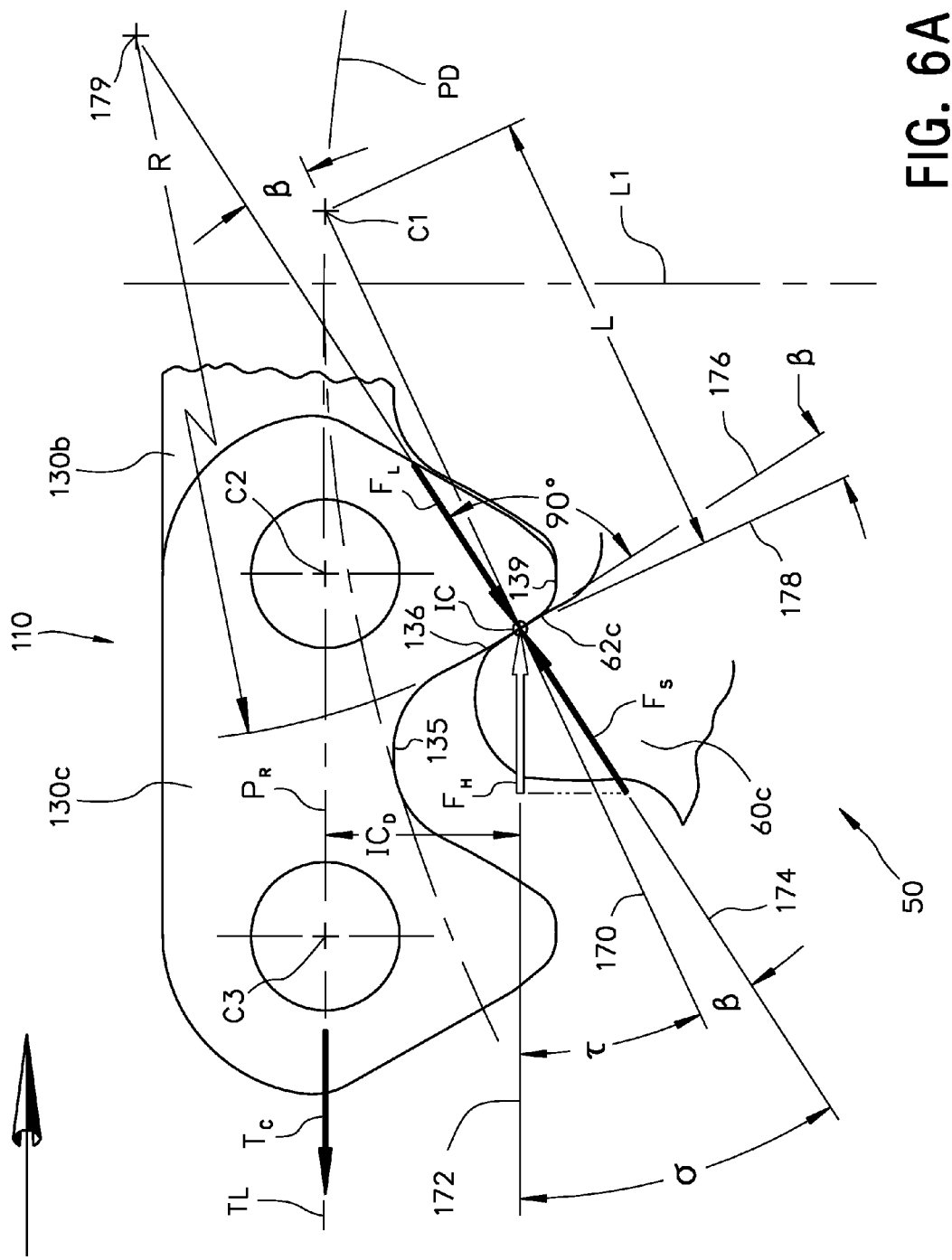
FIG. 6A is an enlarged portion of FIG. 6.

The chain 110 will mesh with a conventional sprocket 50 as shown in FIGS. 6 and 6A and at least one other sprocket to define a chain drive system 115. In FIGS. 6 and 6A, the chain link row 130c is at the onset of meshing with a sprocket tooth 60c of sprocket 50 (reference will usually be made only to the individual chain link plates 130 visible in the foreground of each row 130a, 130b, 130c, etc., but those of ordinary skill in the art will recognize that each row includes multiple chain link plates 130 arranged across each row). Successive pin centers C are numbered C1, C2, C3, C4, etc. to distinguish them from each other. The row 130c is shown at the instant of initial meshing contact with a corresponding sprocket tooth 60c, i.e., at the instant of initial contact between the chain link plate inside flank 136 and the engaging flank 62c of the sprocket tooth 60c at an initial contact location IC on the engaging flank 62c. An initial contact angle Theta ($\theta$) is defined between a first radial reference line L1 originating at the axis of rotation of the sprocket and extending normal to the tangent line TL and a second radial reference line TC originating at the axis of rotation of the sprocket and extending through the tooth center of the subject sprocket tooth 60c. The meshing cycle for the preceding sprocket tooth 60b was previously completed, with the leading pin center C1 of link row 130b (which is also the trailing pin center C of link row 130a) located on the pitch diameter PD as controlled by contact between the trailing outside flank 137 of link row 130a and the engaging flank 62b of the sprocket tooth 60b at location OF. Link row 130b is in the above-described "suspended state" with neither its leading inside flanks 136 nor its trailing outside flanks 137 directly contacting the sprocket 50. The pin center C1 is deemed the "controlling pin center" in that it is the closest (in terms of chain travel direction) preceding or downstream pin center C relative to the leading pin center C2 of the meshing link row 130c (the controlling pin center C1 is also the trailing pin center of the closest (in terms of chain travel direction) fully meshed link row 130a). As such, the following relationships are defined:

a meshing contact angle Tau ($\tau$) is defined between the tangent line TL and an initial contact reference line 170 that passes through both the controlling pin center C1 and the initial contact location IC;

the initial contact reference line 170 defines a length L lever arm between the controlling pin center C1 and the initial contact location IC;

a link plate entrance angle Beta ($\beta$) is defined between the initial contact reference line 170 and an inside flank reference line 174 that passes through the arc center 179 of the inside flank radius R and the initial contact location IC (the inside flank reference line 174 will be normal to the involute curve (or radial arc segment or other curved surface) of the engaging flank 62c of the sprocket tooth 60c);

a meshing impact angle Sigma ($\sigma$) is defined between the tangent line TL and the inside flank reference line 174, i.e., $\sigma=\tau+\beta$.

Figure 1:
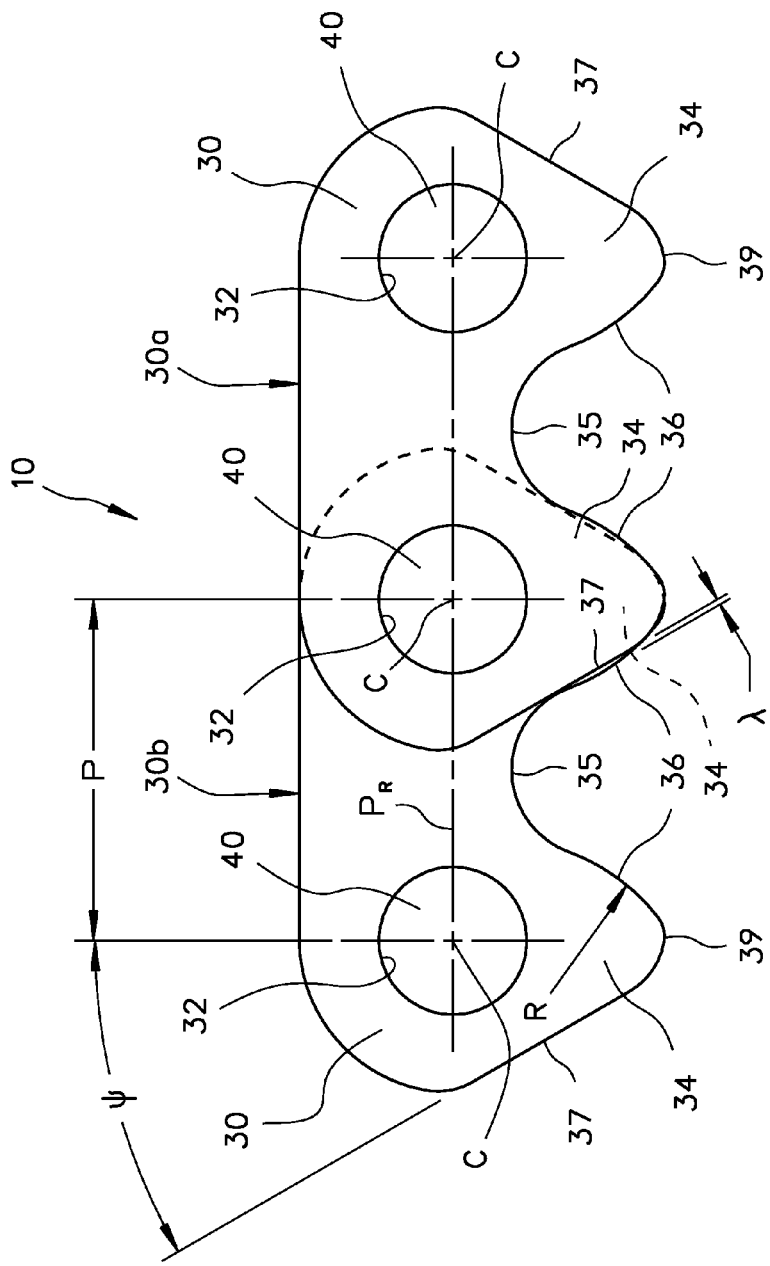
FIG. 1 illustrates first and second link rows of a known inverted tooth chain with the guide plates removed to reveal the underlying link plates.
Figure 2A:
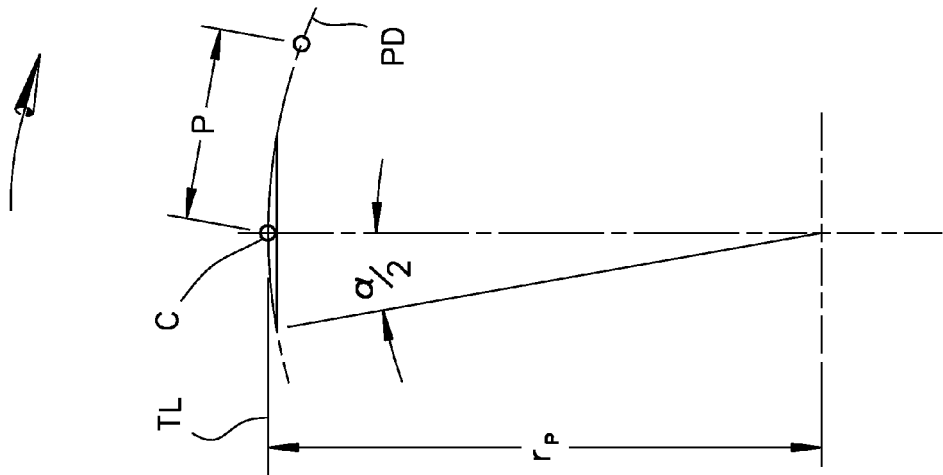
FIGS. 2A and 2B illustrate chordal rise for a sprocket.
Figure 2B:
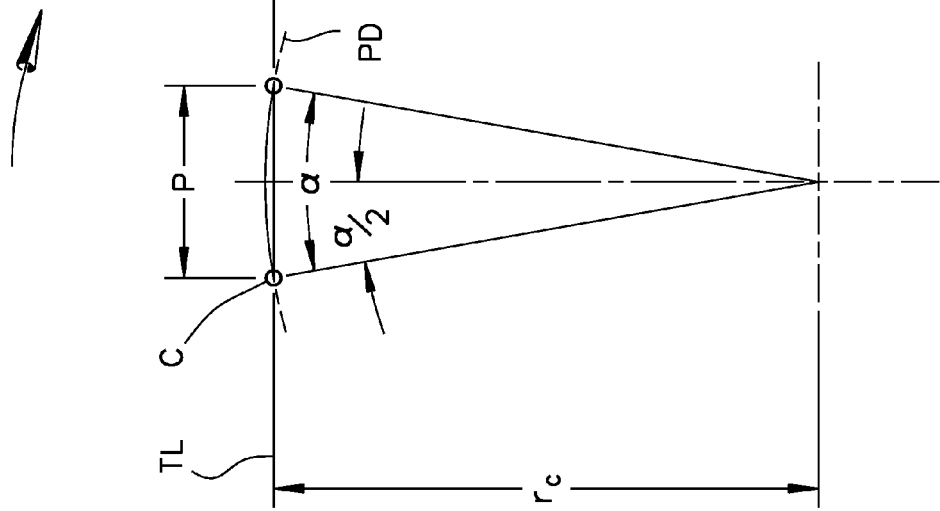
Figure 3:
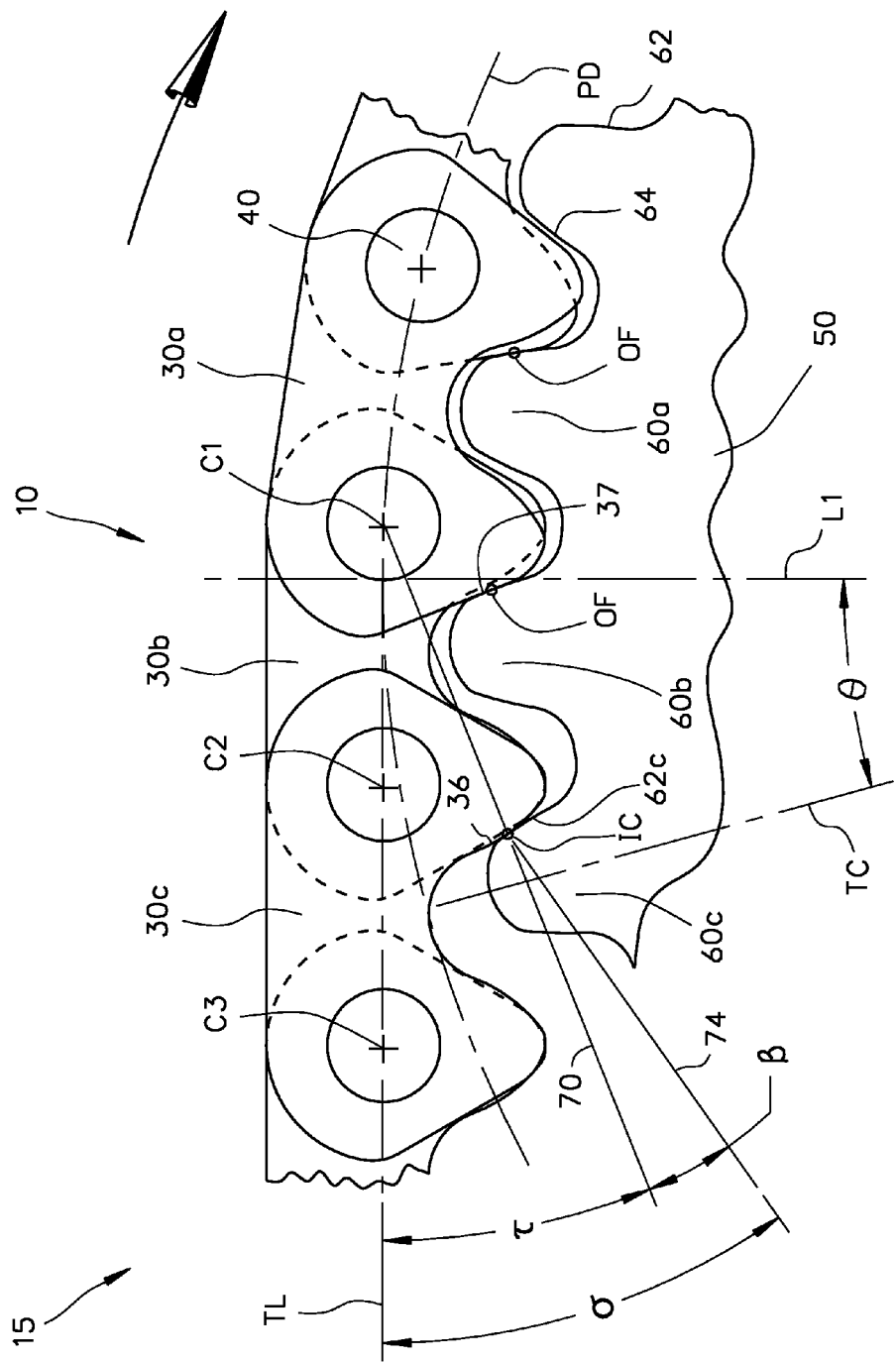
FIG. 3 shows the chain of FIG. 1 with a link row at the onset of meshing with a sprocket tooth of a known sprocket in a chain drive system.
Figure 3A:
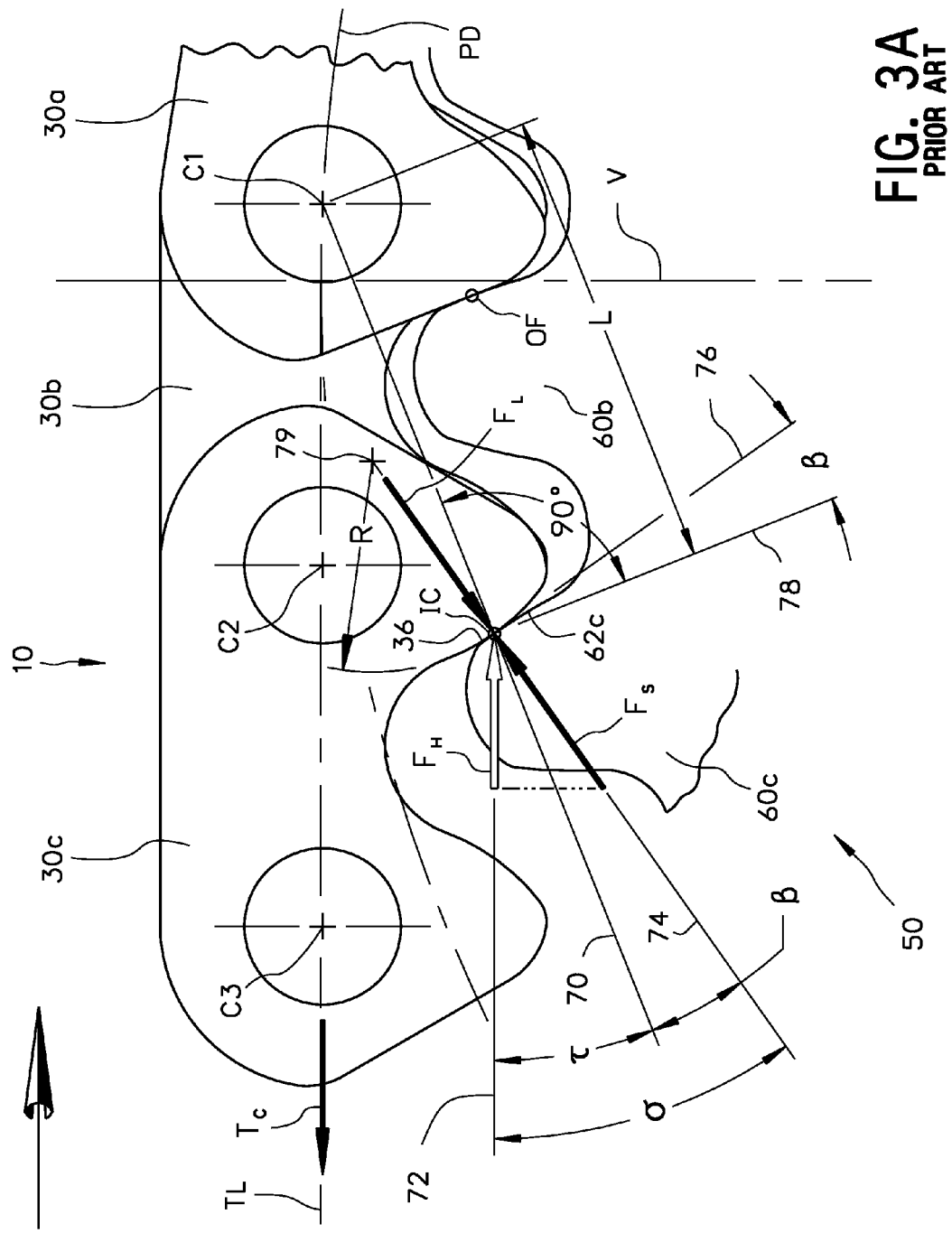
FIG. 3A is an enlarged portion of FIG. 3.

In FIG. 6A, the meshing impact angle Sigma ($\sigma$) and its constituents are shown relative to a reference line 172 that is parallel to the tangent line TL and that extends through the initial contact location IC, coincident with the force vector $F_H$. As shown in FIGS. 6 and 6A, unlike the prior art chain 10 of FIGS. 1 and 3, the shape of the link plates 130 of the chain 110 is designed to optimize initial meshing impact geometry at the initial contact location IC between a sprocket tooth 60c and a chain link row 130c at the leading inside flanks 136 of the link plates 130 as the sprocket tooth 60c collects the link row 130c from the chain span, to reduce the link impact force $F_L$ and the resultant impact energy E. As such, the shape of the link plates 130 reduces noise and vibration levels associated with the chain-sprocket meshing phenomena. As further described below in relation to FIGS. 7 and 7A, the improved link plate form 130 also results in optimized meshing contact geometry for the subsequent transition to full chordal meshing contact OF at the trailing outside flanks 137 of a preceding link row 130b to complete the meshing process for the same tooth.

To design a link plate 130 in accordance with the present development, the inside flank 136 of link plate 130c is determined as a function of the desired initial contact location IC with a sprocket tooth 60c, and this is preferably established with a sprocket size (number of teeth) at or near the smallest tooth count for the family (range of tooth counts) of sprockets to be used with the chain 110. The outside flank 137 is already determined prior to this, however, since the trailing outside flank 137 of the closest fully meshed link row (in this case link row 130a) serves to position the meshing link rows 130b,130c, and the profile for the inside flank 136 of the link plate 130 can then established at its initial meshing impact (initial contact) IC rotational position.

As noted above, the meshing impact angle σ, as illustrated in FIGS. 6,6A, is defined by the following equation:

$$\sigma=\tau+\beta$$

where $\tau$ is the link plate meshing contact angle and $\beta$ is the link plate entrance angle at the onset of meshing impact. In that tooth impact reaction force $F_S$ will vary with the magnitude of the meshing impact angle σ for a constant chain tension $T_C$, there is a benefit for the meshing impact angle σ to be as small as practical when establishing the form of the inside flank 136.

Figure 5C:
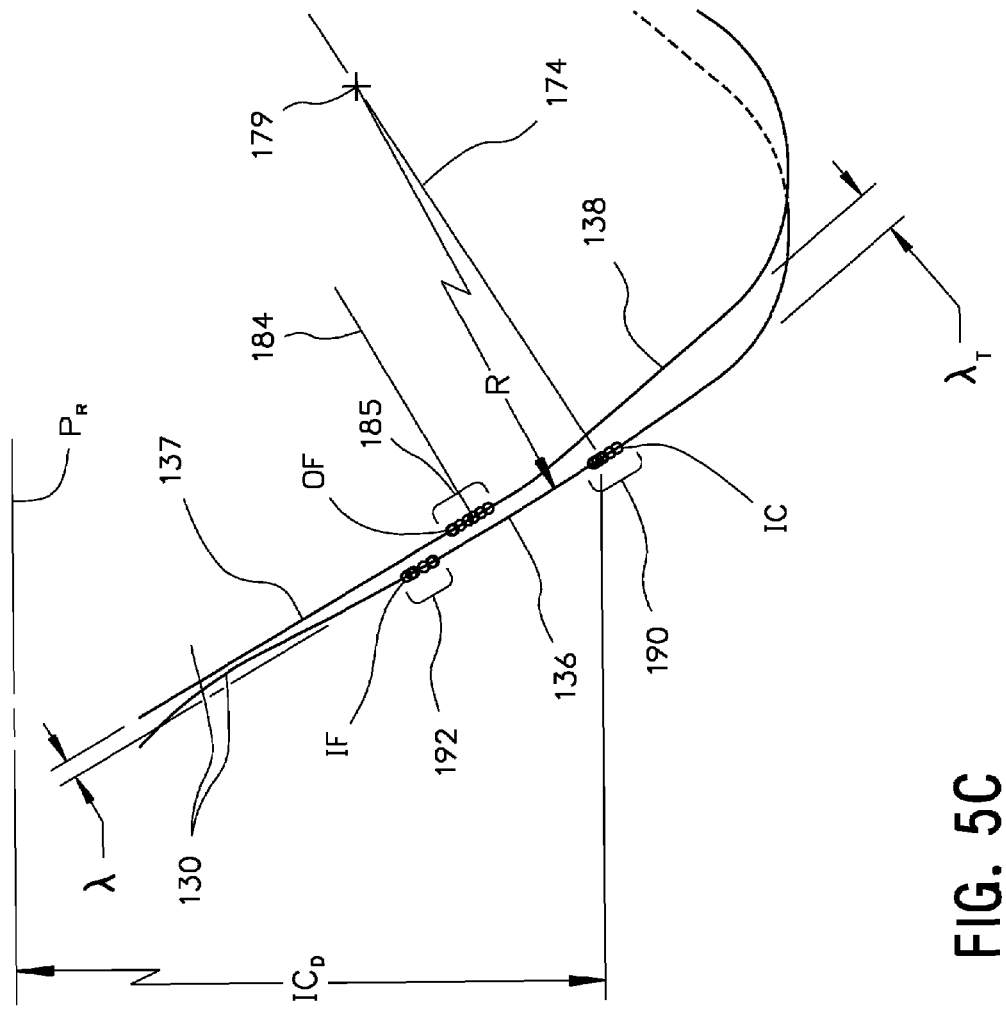
FIG. 5C shows detail region 5A of FIG. 5, and illustrates the locations on the chain that make contact with an engaging flank of a sprocket tooth over a meshing cycle.

Referring still to FIG. 6A, a rotational position for the controlling pin center C1 and the meshing contact angle $\tau$ are selected to place the initial contact location IC in a desired region on the inside flank 136 that will serve to best satisfy the meshing geometry and link plate loading. As shown in FIG. 5C, for the illustrated chain with a pitch P=7.7 millimeters (mm), the initial contact location IC on the inside flank 136 is spaced at a desired initial contact distance $IC_D$ from a pin center reference line $P_R$ that extends between the pin centers C of the link plate (pin centers C2,C3 of FIGS. 6 & 6A). This desired initial contact distance $IC_D$ was determined for a sprocket 50 tooth count at or near the smallest tooth count for the family (range of tooth counts) to be used with chain 110 and $IC_D$ will vary for all other tooth counts in the range. The design of the inside flank 137 for the link plate 130 is therefore determined when meshing with a conventional sprocket 50 at or near the smallest used tooth count. The optimal initial contact distance $IC_D$ for a given link plate will be a function of the link plate design, in particular the inside flank, and $IC_D$ will of course vary as chain pitch P varies.

As shown in FIG. 6A, a reference line 176 is tangent to both the sprocket tooth engaging flank 62 and the link plate inside flank 136 at initial contact location IC. The inside flank reference line 174 is thus perpendicular the reference line 176 and will therefore be normal to the involute surface of the tooth flank 62 at the initial contact location IC. Reference line 178 is perpendicular to initial contact reference line 170. It follows that the magnitude of the link plate entrance angle Beta ($\beta$) will be a resultant of the meshing contact angle $\tau$ selection. The rotational position of the controlling pin center C1 and the meshing contact angle $\tau$ selection effectively define the link plate entrance angle $\beta$, and therefore also define the meshing impact angle σ. As graphically shown in FIG. 6A, meshing impact reaction force $F_S$ becomes a smaller value as the meshing impact angle σ is reduced. When defining the profile of the link plates 130, it is thus desirable to select a value for pin center C1 rotation (i.e., the rotational position of the controlling pin center C1) and meshing contact angle $\tau$ that will satisfy the following relationships:

$\sigma=(\tau+\beta)\leq 34°$ at initial meshing impact IC where $\beta\leq 9°$

A system in which $\sigma=(\tau+\beta)\leq 34°$ and $\beta\leq 9°$ at initial meshing impact IC will result in a reduction of the link impact force $F_L$ and the resultant impact energy E as compared to prior systems (as defined in the background above).

Figure 4:
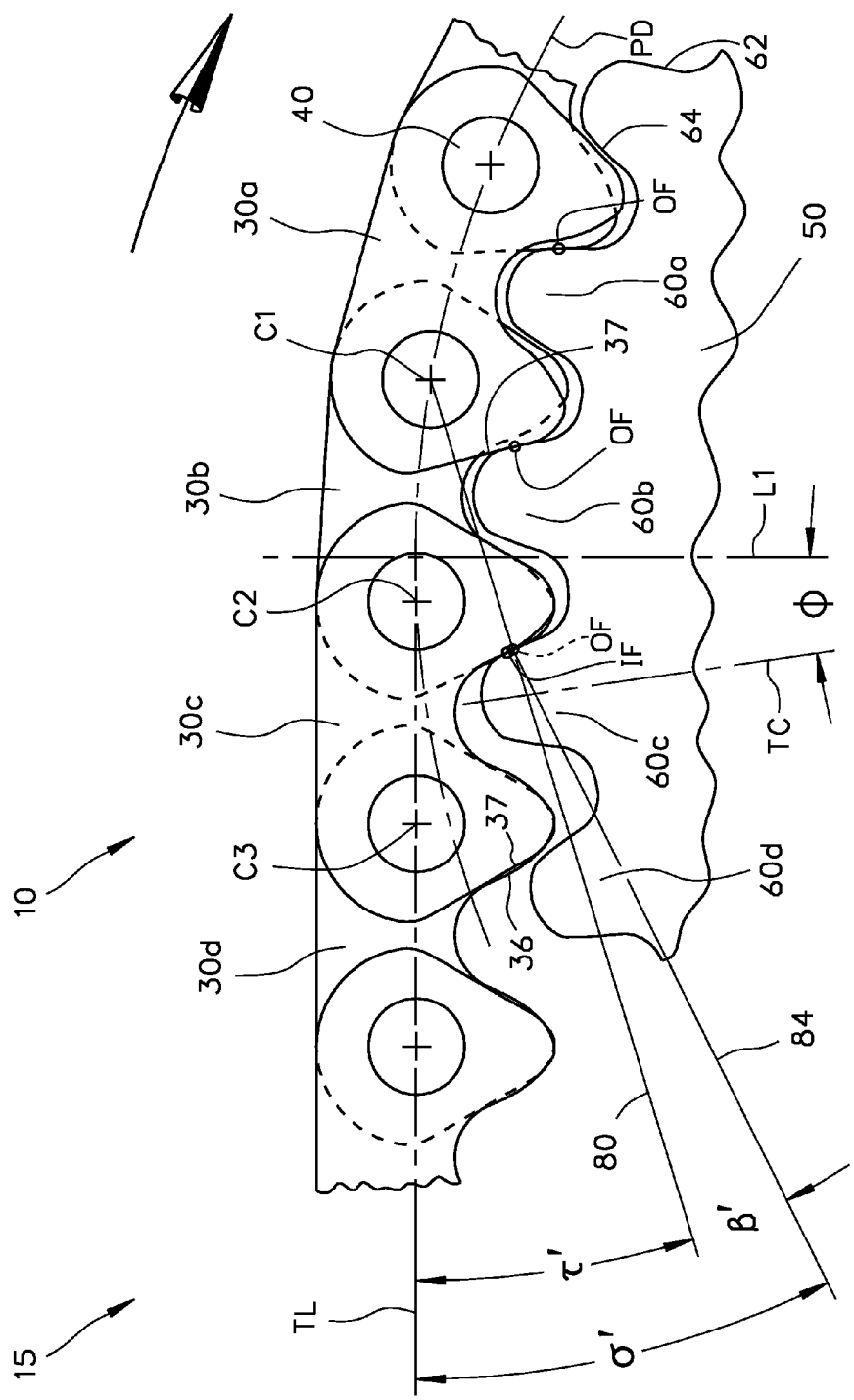
FIG. 4 shows the system of FIG. 3 wherein two consecutive link rows of the chain are in simultaneous meshing contact with a sprocket tooth.
Figure 4A:
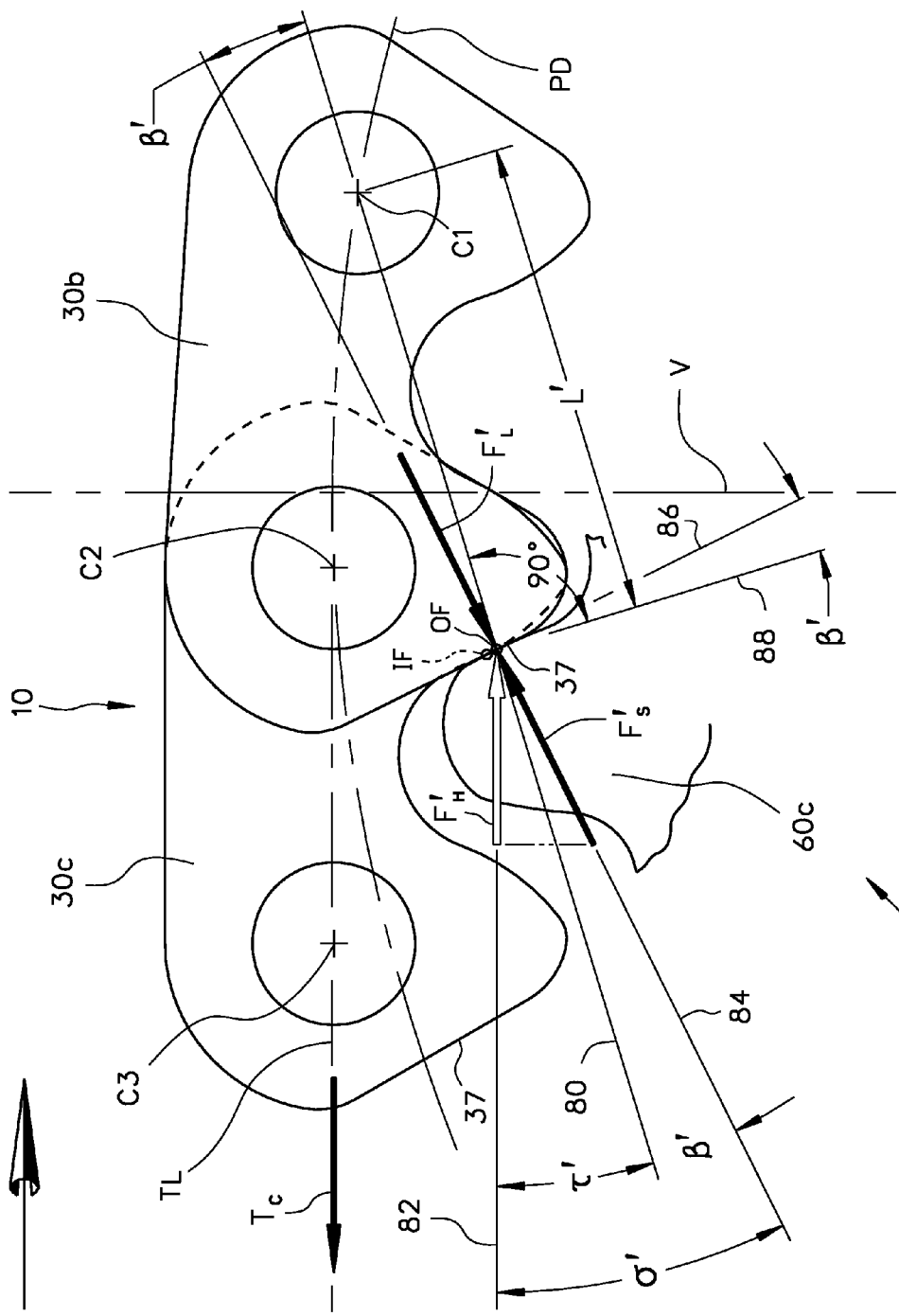
FIG. 4A is an enlarged partial view of FIG. 4 with a link plate in the foreground removed for clarity in order to more clearly show the simultaneous meshing contacts.
Figure 7:
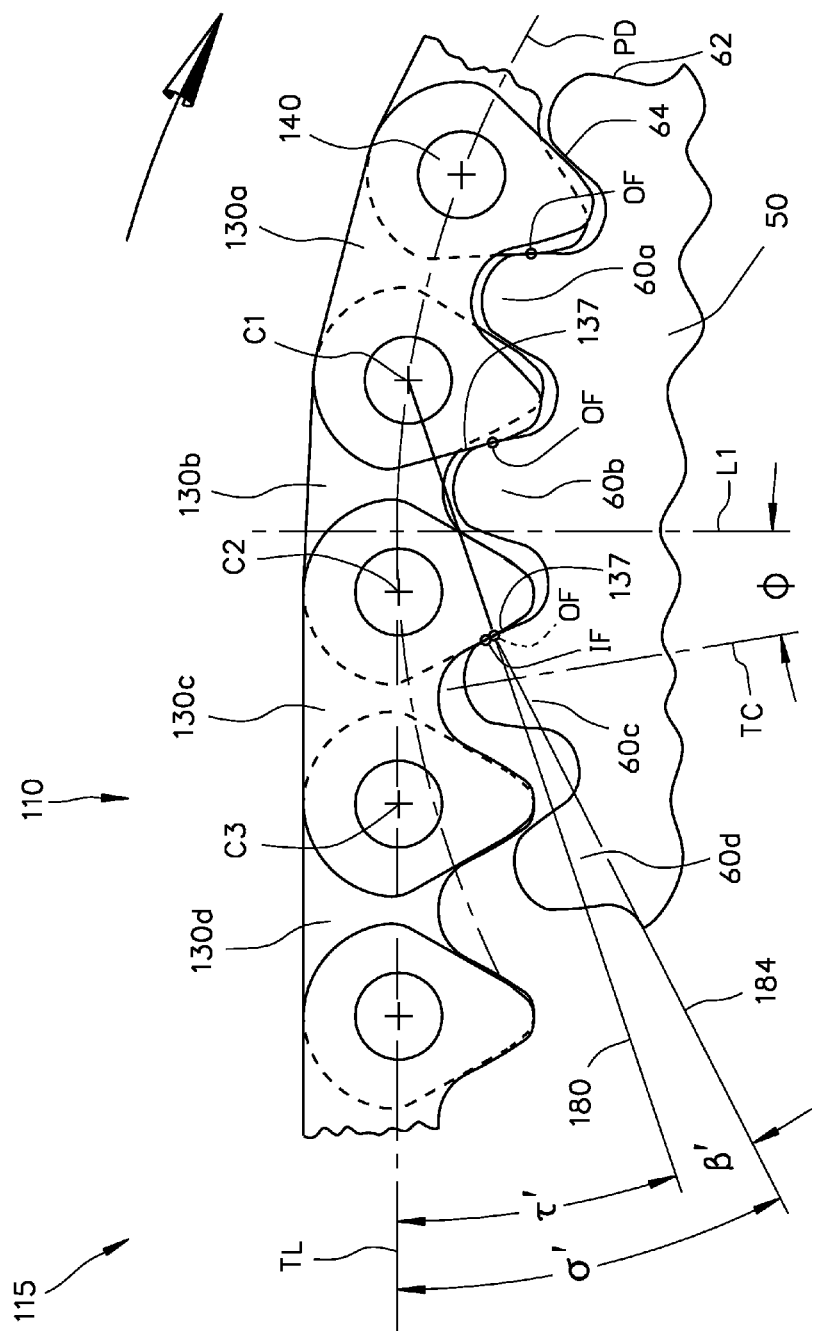
FIG. 7 shows the system of FIG. 6 wherein two consecutive link rows of the chain are in simultaneous meshing contact with a sprocket tooth.
Figure 7A:
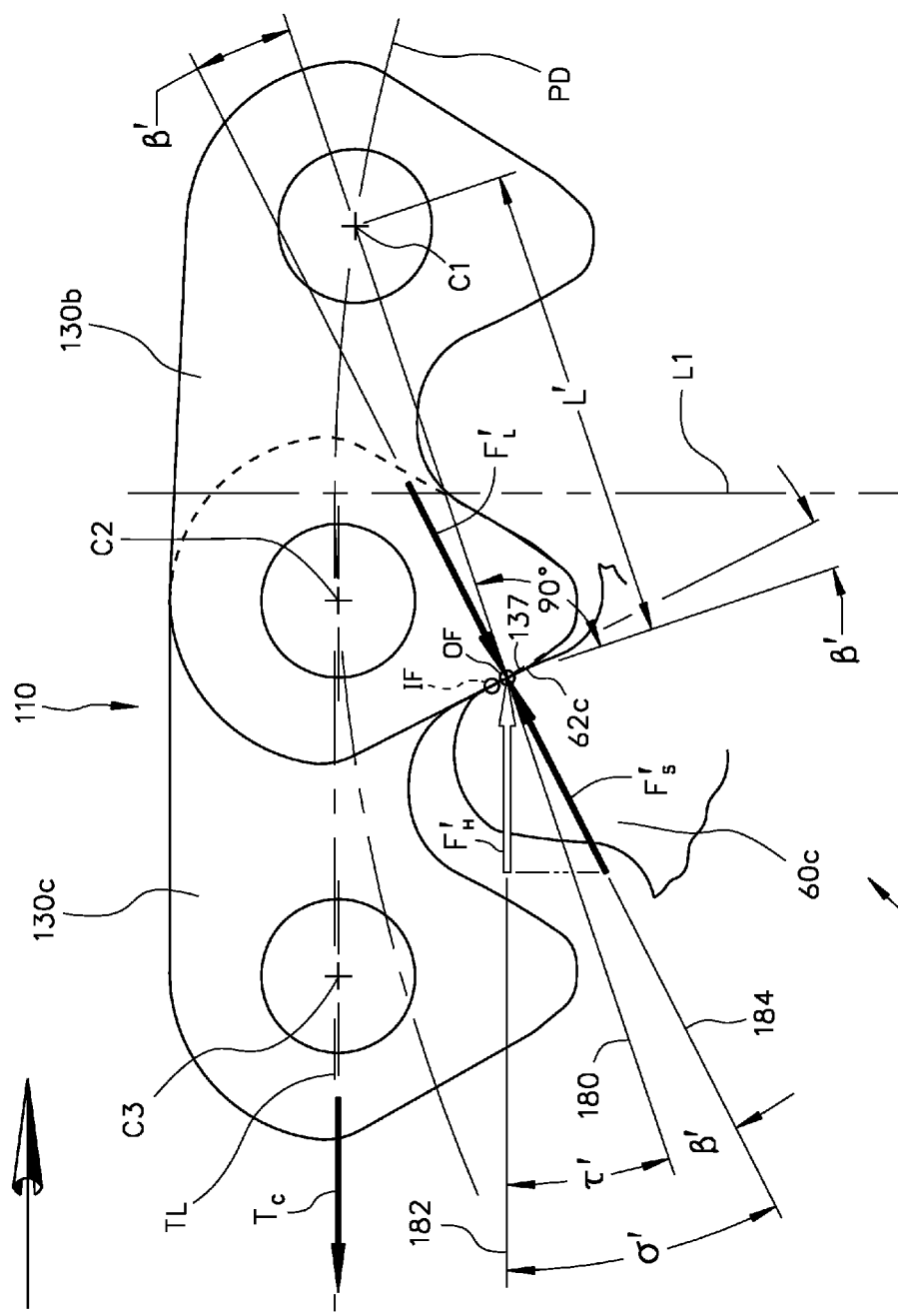
FIG. 7A is an enlarged partial view of FIG. 7 with a link plate in the foreground removed for clarity in order to more clearly show the simultaneous meshing contacts.

FIGS. 7 and 7A correspond respectively to FIGS. 4 and 4A, in that FIGS. 7 and 7A show simultaneous meshing contact for the chain 110. As such, FIG. 7 is similar to FIG. 6 but shows the sprocket 50 rotated further through the meshing cycle until the instant when the trailing outside flanks 137 of preceding link row 130b make contact with the engaging flank 62c of sprocket tooth 60c at an outside flank contact location OF while the leading inside flanks 136 of link row 130c are also contacting the engaging flank 62c at a location IF. As noted above, the instant at which the tooth 60c transitions from inside flank only contact with leading inside flanks 136 of link row 130c also to outside flank contact with trailing outside flanks 137 of preceding link row 130b at an outside flank contact point OF can be referred to as a transition point, and also defines the end of the meshing cycle for the tooth 60c, because the link row 130b is fully meshed with both its leading and trailing pin centers C1,C2 located on the pitch diameter PD. A transition angle Phi (φ) is defined between the first radial reference line L1 and the second radial reference line TC passing through the tooth center of tooth 60c.

FIG. 7A is an enlarged partial view of FIG. 7 and shows that:

a transition contact angle Tau' (τ') is defined between the tangent line TL and a transition contact reference line 180 that passes through both the outside flank contact location OF and the controlling pin center C1 which, for the transition phenomenon, is the leading pin center of the link row transitioning to trailing outside flank contact at location OF;

the transition contact reference line 180 defines a length L' lever arm between the controlling pin center C1 and outside flank contact location OF;

a link plate transition angle Beta' (β') is defined between the transition contact reference line 180 and a outside flank reference line 184 that extends normal to the trailing outside flank 137 (the outside flank reference line 184 will also be normal to the involute curve (or radial arc segment or other curved surface) of the engaging flank 62c of the sprocket tooth 60c;

a transition impact angle Sigma' (σ') is defined between the tangent line TL and the outside flank reference line 184, wherein σ'=τ'+β'.

The resulting link plate transition angle Beta' (β') and transition impact angle Sigma' (σ') will dictate the link impact force $F'_L$ and resultant impact energy E for the transitional impact of the trailing outside flanks 137 at location OF. It should be noted that features in FIGS. 7 and 7A that correspond to features of FIGS. 6 and 6A are labeled with corresponding reference characters including a prime (') designation, and not all are discussed further. Also, in FIG. 7, the transition impact angle Sigma' (σ') and its constituents are shown relative to a reference line 182 that is parallel to the tangent line TL and extending through the outside flank contact location OF, coincident with the force vector $F'_H$. These transitional impacts of the trailing outside flanks 137 at locations OF are thought to be a less significant contributor of noise and vibration as compared to the above described initial meshing impacts of the leading inside flanks 136 at locations IC, but it is believed that controlling the transition impact angle Sigma' (σ') and its constituents, i.e., the link plate transition angle Beta' (β') and the transition contact angle Tau' (τ'), is desirable for further minimizing noise and vibration in the system 115.

Referring back to FIG. 5C, a greatly enlarged portion of the chain 110, including the leading inside flanks 136 of a link row and the trailing outside flanks 137 of a preceding link row are shown. For the chain 110 meshing with the sprocket 50, the initial contact location IC, outside flank contact location OF, and inside flank transitional contact location IF will vary depending upon the sprocket tooth count N and pressure angle, along with corresponding variation in the meshing impact angle Sigma (σ) and transition impact angle Sigma' (σ'), given that the chain 110 is designed to mesh with a family of sprockets having a tooth count in the range of 19 to 50 for a 7.7 millimeter (mm) chain link pitch P. In particular, the initial contact location IC will vary in a region 190, the outside flank contact location OF will vary in a region 185, and the inside flank transitional location IF will vary in a region 192, as a function of the sprocket tooth count N and pressure angle.

It should be noted that Lamda (λ) is measured relative to the straight "contact" or "working" portion of the outside flank 137 when the chain is pulled straight. First and second rows of the chain are deemed to be pulled straight when all pin centers C thereof located on a single line. The working portion of an outside flank 137 is the region thereof where the outside flank contact location OF is located, for all sprocket tooth counts intended to be meshed with the chain 110. The chamfer 138 is referred to as a "non-contact" or "non-working" portion of the outside flank 137 because it will not contact the sprocket teeth for all sprocket tooth counts intended to be meshed with the chain 110. The chamfer 138, which need not be flat, is included to ensure that at least the portion of the leading inside flanks 136 of the adjacent link row required to make initial contact IC with the sprocket 50 will always project outwardly a sufficient distance relative to the adjacent row for all manufacturing tolerance conditions.

Figure 8B:
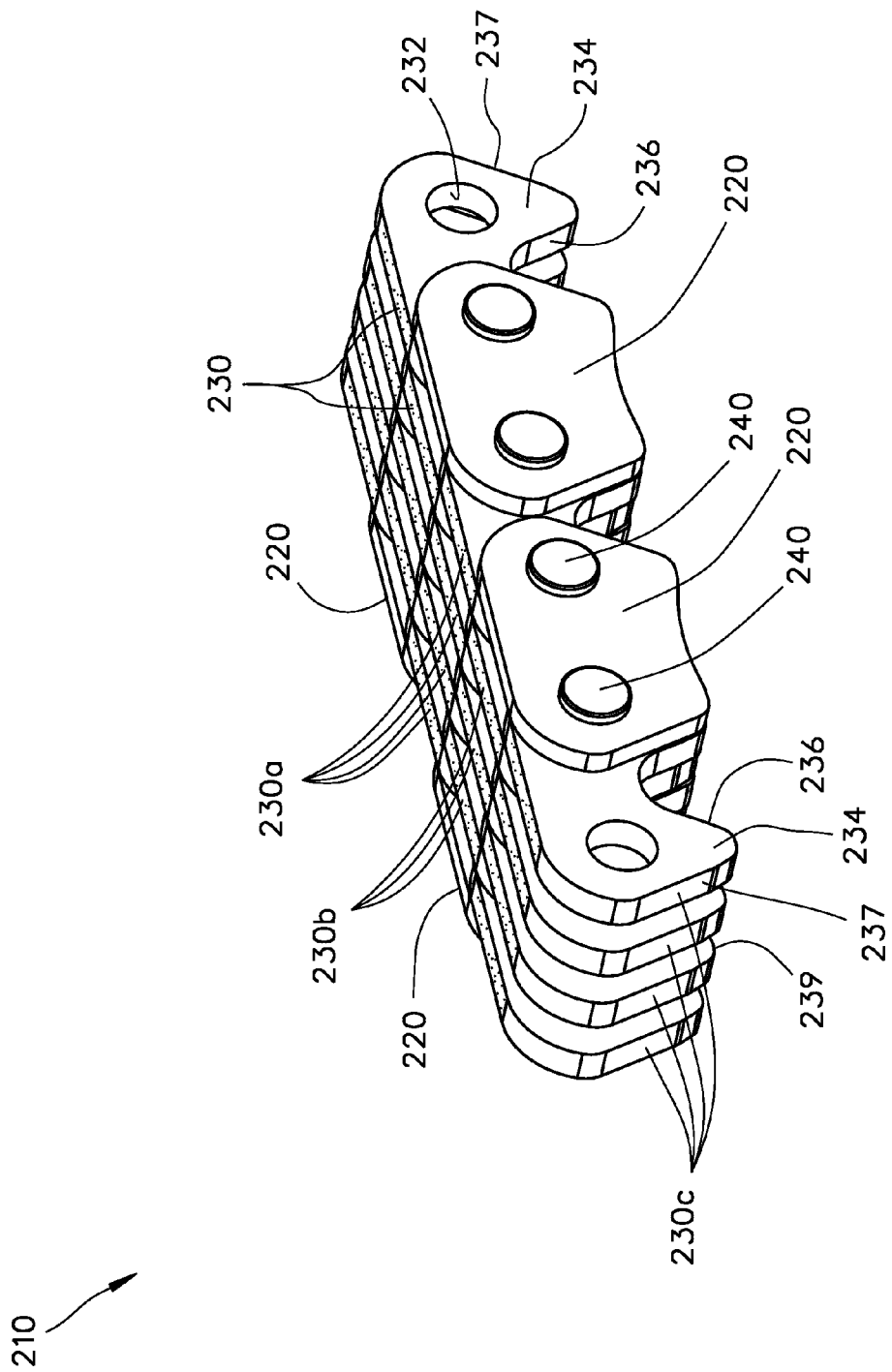
FIG. 8B is an isometric view of multiple link rows of the chain of FIG. 8 including guide plates.
Figure 8C:
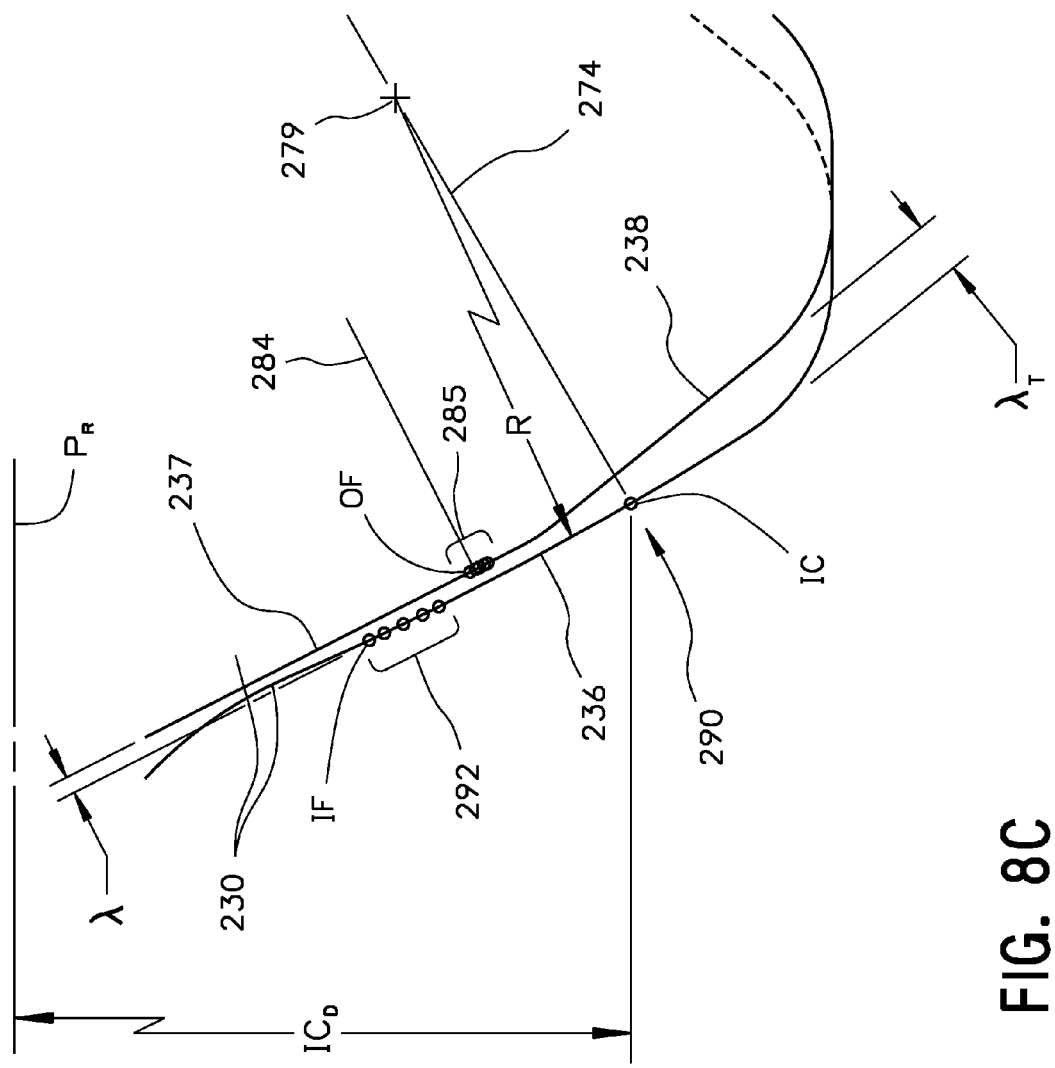
FIG. 8C shows detail region 8A of FIG. 8, and illustrates the locations on the chain that make contact with an engaging flank of a sprocket tooth over a meshing cycle.
Figure 9:
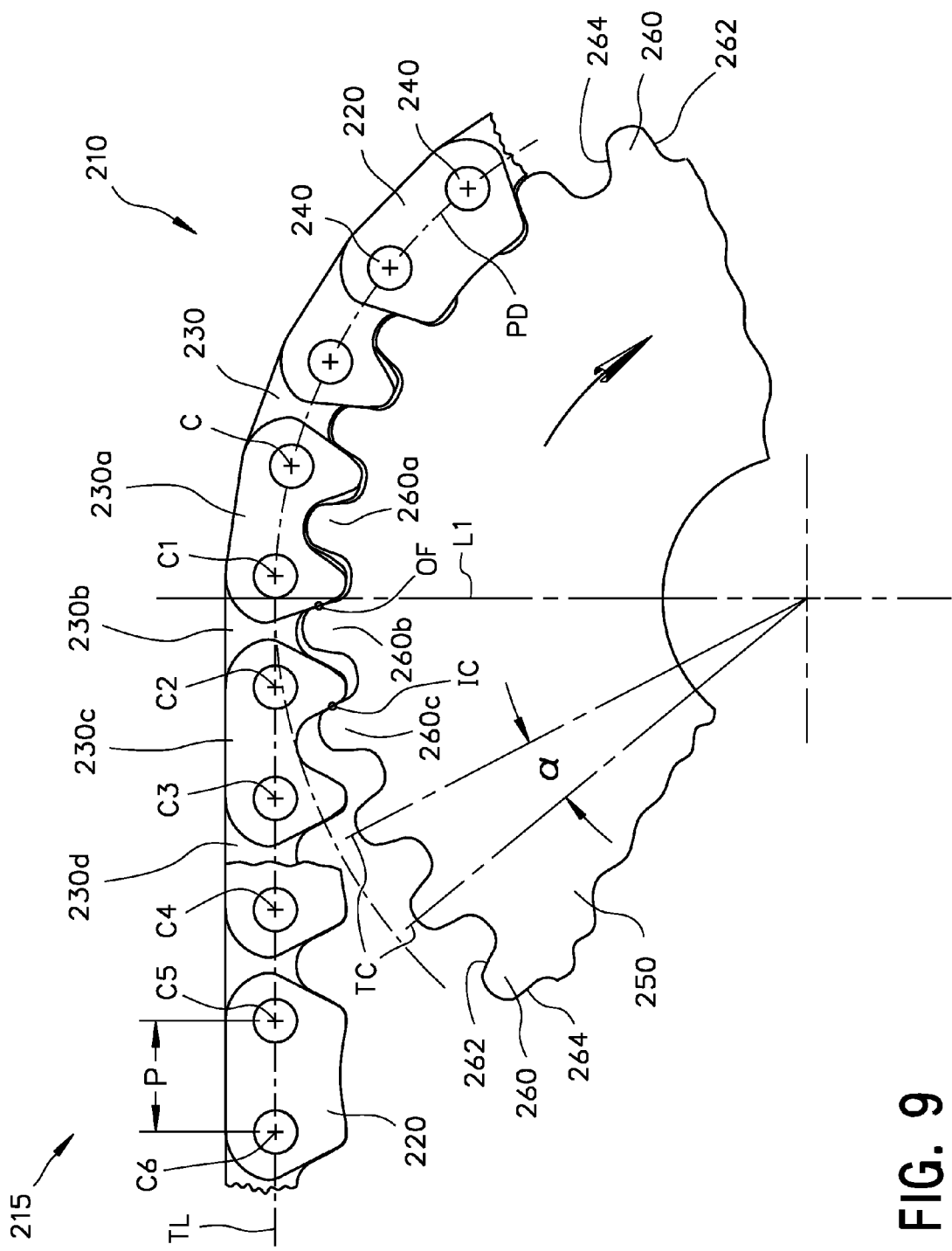
FIG. 9 shows the chain of FIG. 8 meshed with a sprocket having tooth flanks defined with reduced pressure angles in accordance with another aspect of the present invention.

The ability to minimize the meshing impact angle σ and transition impact angle σ' is limited when the chain 110 must mesh with a conventional sprocket such as the sprocket 50 having teeth defined with conventional pressure angles as defined in Table 1. According to an alternative embodiment of the present invention, a chain 210 as shown in FIGS. 8, 8A, 8B is defined to mesh with a new, modified sprocket 250 formed in accordance with the present development as shown in FIG. 9. A chain and sprocket drive system 215 is defined by the chain 210 meshed with the sprocket 250 and at least one other sprocket defined according to the structure of the sprocket 250 (with the same or different tooth count). The sprocket 250 includes teeth 260 (260a, 260b, 260c, etc.) defined with a pressure angle that is smaller than the conventional pressure angles as shown in Table 1 above, with the result being an increased steepness of the engaging flanks 262 (262a, 262b, 262c, etc.) as compared to the engaging flanks 62 of sprocket 50. This is shown in Table 2 that follows (all teeth 260 of a given sprocket 250 are defined with the same pressure angle PA):

TABLE 2

| Sprocket Tooth Count (N) | Sprocket 250 Pressure Angle (PA) |
|---|---|
| 19-25 | 28° ≤ PA ≤ 29° |
| 26-50 | 27° ≤ PA < 28° |

Those of ordinary skill in the art will recognize that the tooth counts shown in Table 2 will increase or decrease as chain pitch P increases or decreases from the present example of P=7.7 mm. In particular, the tooth count ranges will shift up as chain pitch P decreases and will shift down as chain pitch P increases.

Figure 9A:
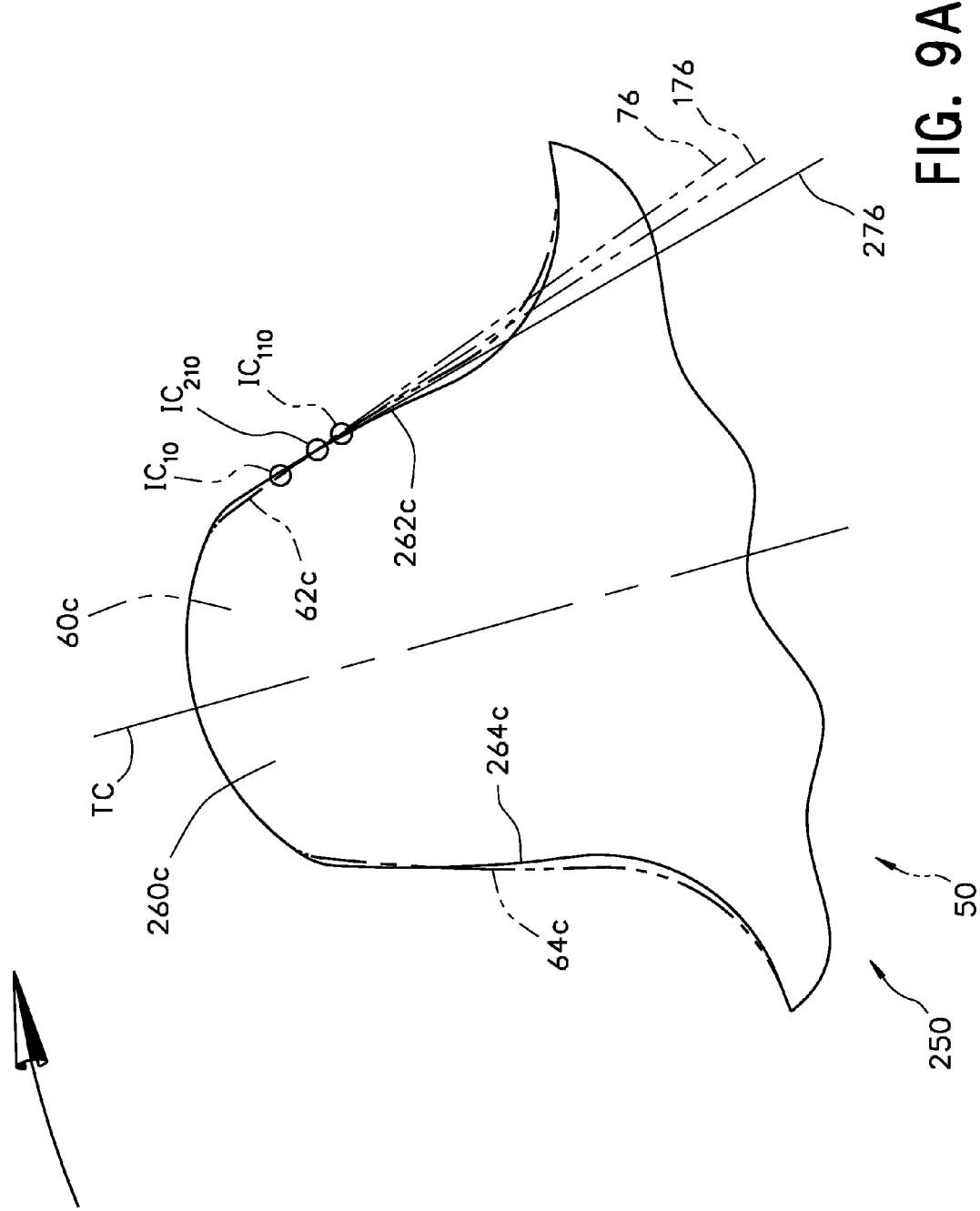
FIG. 9A is a greatly enlarged view of a tooth of the sprocket of FIG. 9 with a tooth of the conventional sprocket of FIG. 3 overlaid in phantom lines.

FIG. 9A shows a tooth 260c of the sprocket 250 including an engaging flank 262c and disengaging flank 264c symmetrically defined about the tooth center TC. The tooth 60c of the conventional sprocket 50 is shown in phantom lines. It can be seen that the tooth flanks 262c, 264c defined with the smaller pressure angle are much steeper as compared to the tooth flanks 62c, 64c defined with the conventional pressure angle. The reference lines 76 and 176 are respectively tangent to the engaging flank 62c at initial contact locations $IC_{10}$, $IC_{110}$, with the initial contact location $IC_{10}$ showing the initial contact location for the chain 10 and the initial contact location $IC_{110}$ showing the initial contact location for the chain 110. The reference line 276 is tangent to the engaging flank 262c at initial contact location $IC_{210}$ where the leading inside flanks 236 of a meshing link row 230 of chain 210 make initial meshing contact with the engaging flank 262c.

Figure 10:
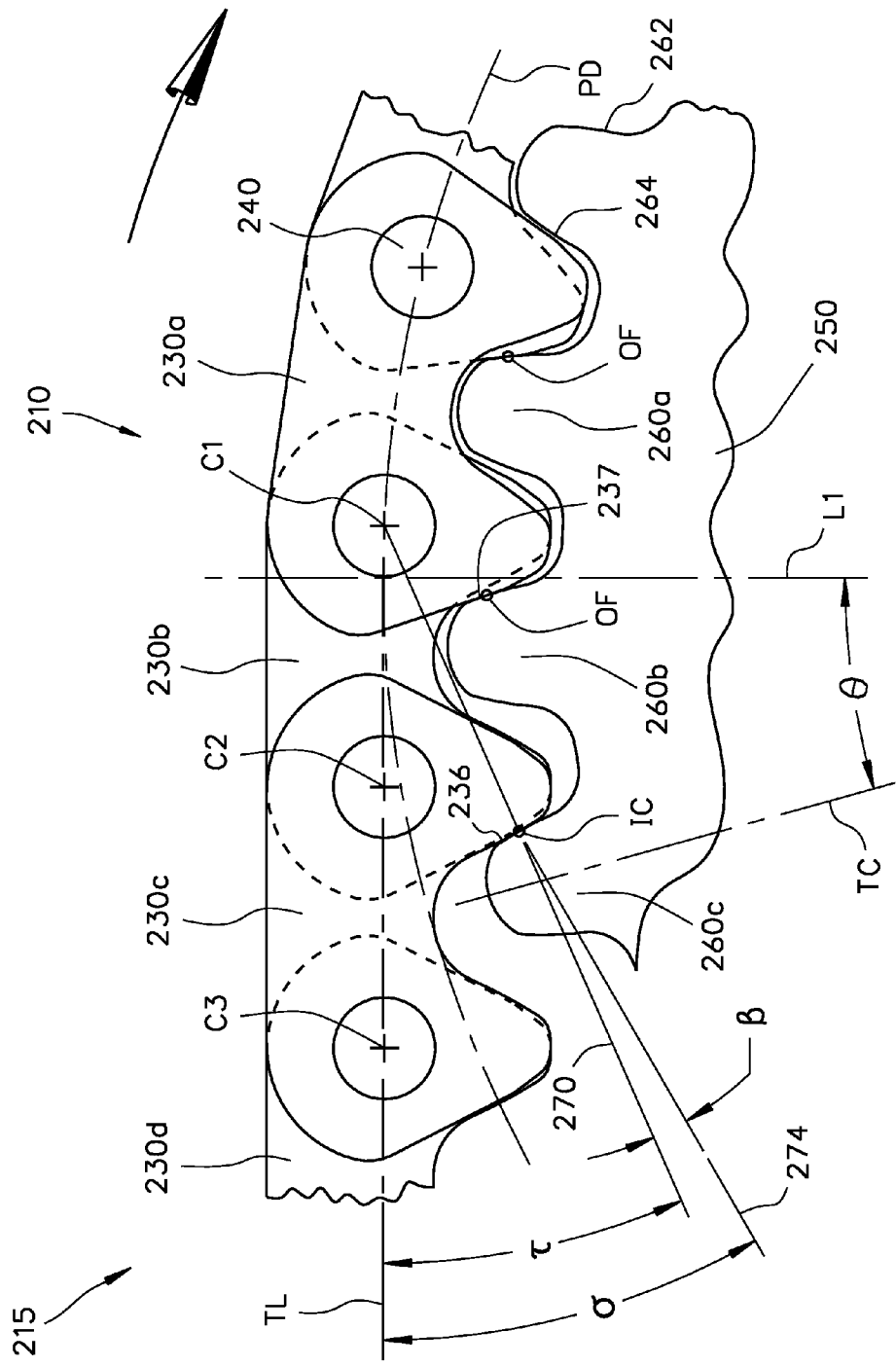
FIG. 10 is an enlarged portion of FIG. 9 and shows the chain of FIG. 8 with a link row at the onset of meshing with a sprocket tooth.

With reference also to FIG. 10, for the sprocket 250 with modified pressure angles, the meshing impact angle σ can be further reduced for additional noise and vibration improvement as follows:

$\sigma = (\tau + \beta) \leq 31°$ (for inside flank initial meshing contact IC)

where $\beta \leq 7°$. In such case, the outside flank angle $\psi$ must also be reduced such that:

$\psi \leq 27°$ in order for the chain 210 to mesh properly with the sprocket 250. This will lead to a reduced transition impact angle $\sigma' = (\tau' + \beta') \leq 26°$ (for transition to outside flank full meshing contact OF) and where $\beta' \leq 8°$.

Figure 10A:
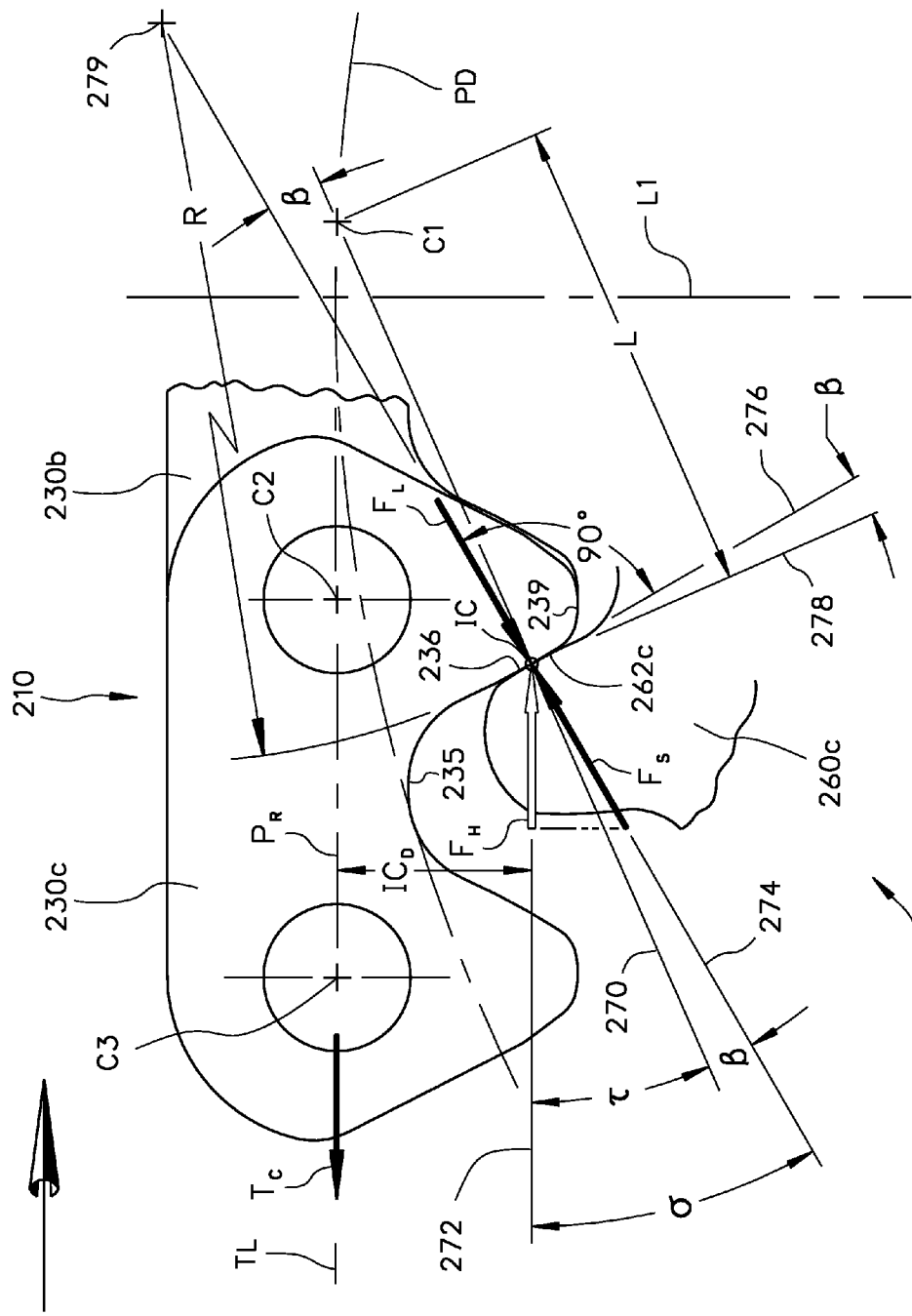
FIG. 10A is an enlarged portion of FIG. 10.
Figure 11:
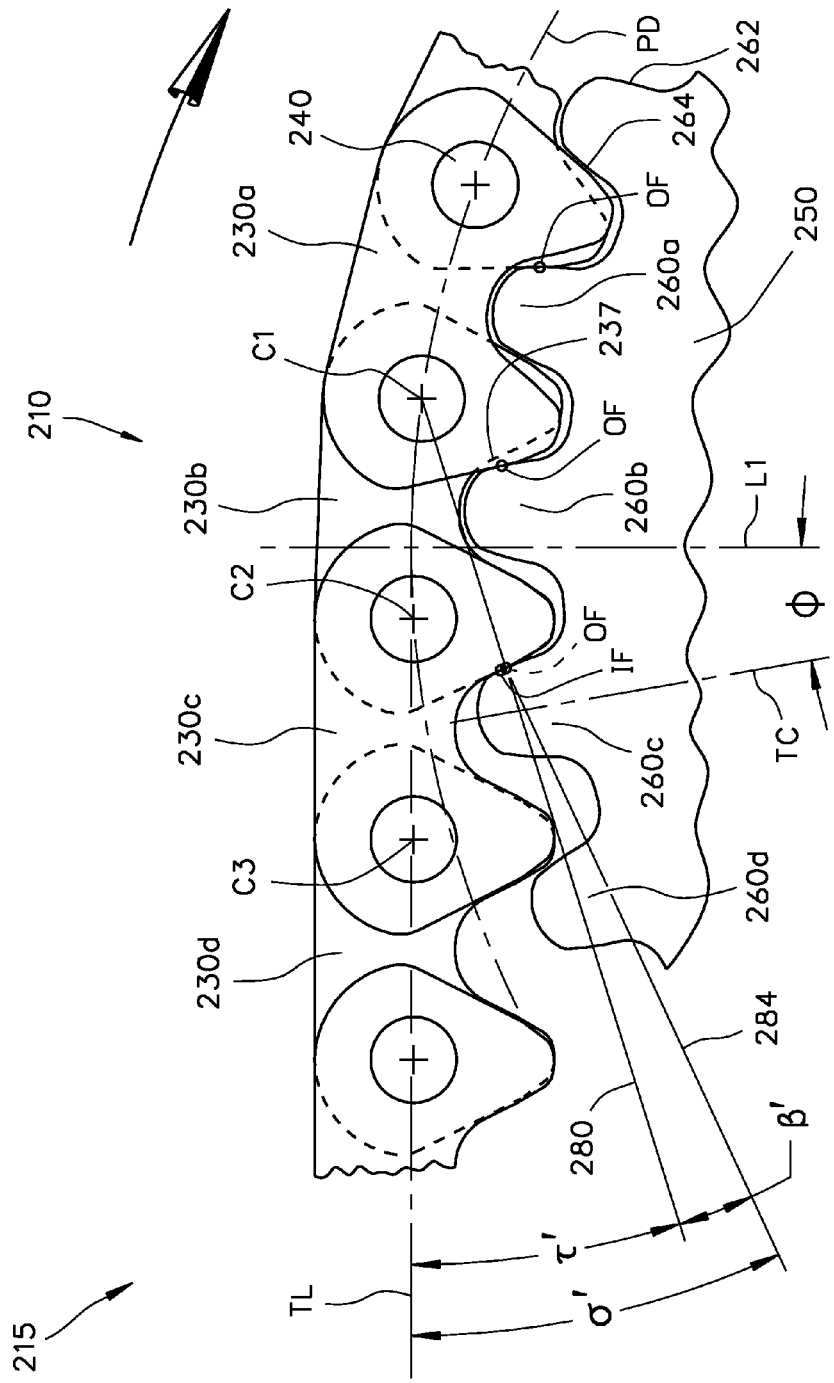
FIG. 11 shows the system of FIG. 10 wherein two consecutive link rows of the chain are in simultaneous meshing contact with a sprocket tooth.
Figure 11A:
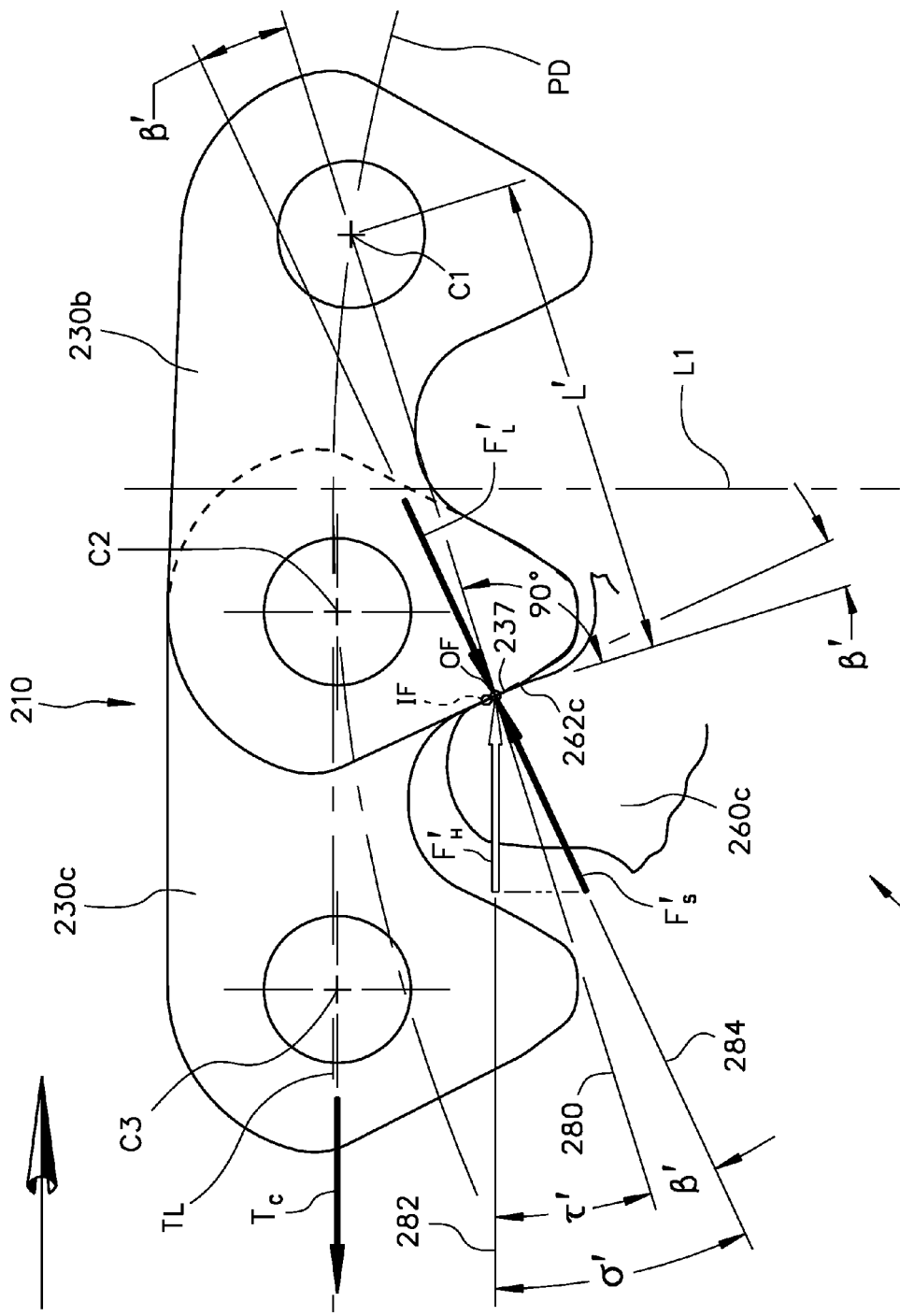
FIG. 11A is an enlarged partial view of FIG. 11 with a link plate in the foreground removed for clarity in order to more clearly show the simultaneous meshing contacts

Except as otherwise shown and described herein, the chain 210 shown in FIGS. 8-11A is identical to the chain 110, and like components are labeled with reference numbers that are 100 greater than those used for the chain 110. The inside flanks 236 have a convexly arcuate form and the inside flanks will preferably project outwardly relative to the outside flanks 237 of adjacent link rows by a projection amount Lamda ($\lambda$) to satisfy the relationship $0.007 \times P \leq \lambda \leq 0.017 \times P$ where P is equal to the chain pitch length. The inside flank 236 is preferably formed to satisfy the inequality:

$P \leq R < 2P$ where R is the radius of curvature of the inside flank 236 and P is the chain pitch length. Each inside flank 236 is defined by a radial arc segment defined by a radius R centered at an arc center 279 (FIG. 10A) and that extends from the crotch 235 to the tip 239. Likewise, the sprocket 250 is identical to the sprocket 50 except as otherwise shown or described herein, and like features are labeled with reference numbers that are 200 greater than those used for the sprocket 50. Furthermore, FIGS. 10 and 10A correspond respectively to FIGS. 6 and 6A, and FIGS. 11 and 11A correspond respectively to FIGS. 7 and 7A, except that the chain 210 and sprocket 250 are shown instead of the chain 110 and sprocket 50. As such, further discussion of FIGS. 8-11A is not provided here, except to note that by decreasing the sprocket tooth pressure angle and correspondingly decreasing the outside flank angle outside flank angle $\psi$, the meshing impact angle Sigma ($\sigma$) and transition impact angle Sigma' ($\sigma'$) for the chain 210 meshing with the sprocket 250 are both desirably reduced as compared to the meshing impact angle Sigma ($\sigma$) and transition impact angle Sigma' ($\sigma'$) for the chain 110 meshing with the convention sprocket 50. Accordingly, impact energy E and tooth impact reaction force $F_S$ will be further reduced as compared to the system 115 that uses a conventional sprocket 50.

Table 3 that follows provides additional data for the resulting meshing impact angle Sigma ($\sigma$) and link plate entrance angle Beta ($\beta$):

TABLE 3

| Chain Drive System | Max Sigma ($\sigma$) | Max Beta ($\beta$) | Psi ($\psi$) |
|---|---|---|---|
| System 15, Prior Art (FIG. 3) | 37° | 15° | 30° |
| System 115 (FIG. 6) | 34° | 9° | 30° < $\psi$ ≤ 30.5° |
| System 215 (FIG. 10) | 31° | 7° | ≤27° |

Referring back to FIG. 8C, a greatly enlarged portion of the chain 210 is shown, including the leading inside flanks 236 of a link row and the trailing outside flanks 237 of a preceding link row. For the chain 210 meshing with the sprocket 250, the initial contact location IC will be located on the leading inside flanks 236 at a distance $IC_D$ from a pin center reference line $P_R$ that extends between the pin centers C of the link plate 230, as measured normal to the pin center reference line. The outside flank contact location OF, and inside flank transitional contact location IF will vary depending upon the sprocket tooth count N and pressure angle, along with corresponding variation in the meshing impact angle Sigma ($\sigma$) and transition impact angle Sigma' ($\sigma'$), given that the chain 210 is designed to mesh with a family of sprockets having a tooth count in the range of, e.g., N=19 to N=50 for a 7.7 millimeter (mm) chain link pitch P.

Table 4 below illustrates one example of a system 215 in which the sprocket tooth count N vanes from 19 to 50, chain pitch P=7.7 mm, $\lambda$=0.075, and that satisfies the above-noted requirements for Beta ($\beta$) and Sigma ($\sigma$):

TABLE 4

P = 7.7 mm; $\lambda$ = 0.075

| Teeth (N) | Pressure Angle (PA) | Beta ($\beta$) | Sigma ($\sigma$) |
|---|---|---|---|
| 19 | 28.97° | 6.06° | 30.12° |
| 21 | 28.57° | 6.06° | 30.12° |
| 22 | 28.41° | 6.06° | 30.12° |
| 23 | 28.25° | 6.06° | 30.12° |
| 25 | 28.03° | 6.06° | 30.12° |
| 30 | 27.64° | 6.06° | 30.12° |
| 33 | 27.49° | 6.06° | 30.12° |
| 40 | 27.26° | 6.06° | 30.12° |
| 42 | 27.21° | 6.06° | 30.12° |
| 46 | 27.11° | 6.06° | 30.12° |
| 50 | 27.05° | 6.06° | 30.12° |

Those of ordinary skill in the art will recognize that the ability to alter the sprocket pressure angle PA in an IT chain system 215 enables Beta ($\beta$) and Sigma ($\sigma$) to be optimized ($\beta \leq 7°$; $\sigma \leq 31°$) for reduced impact energy E as described above while placing the initial contact location IC at a preferred location (defined by distance $IC_D$) on the inside flank 236.

The invention has been described with reference to preferred embodiments. Modifications and alterations will occur to those of ordinary skill in the art to which the invention pertains, and it is intended that the invention be construed as encompassing all such modifications and alterations.

The invention claimed is:

1. A chain and sprocket drive system comprising:
   a sprocket comprising a plurality of teeth, wherein each tooth comprises an engaging flank and a disengaging flank;
   an inverted tooth chain meshed with the sprocket, said inverted tooth chain comprising a plurality of rows of links that each articulate relative to a preceding link row about a leading pin center and that each articulate relative to a following link row about a trailing pin center, wherein said leading and trailing pin centers are spaced from each other at a chain pitch P, each of said rows comprising leading inside flanks and trailing outside flanks, wherein:
   the leading inside flanks of each row project outwardly relative to a working portion of the trailing outside flanks of a preceding row and comprise an inside flank radius R;
   said chain approaches said sprocket along a tangent line and the engaging flank of each sprocket tooth makes initial meshing contact with said chain at an initial contact location on the leading inside flanks of a meshing row of said chain at an instant of initial meshing contact;
   at said instant of initial meshing contact, a chain row immediately preceding the meshing row includes a leading pin center that is located on a pitch diameter of said sprocket so as to be a controlling pin center;
   for each row of said chain that is fully meshed with said sprocket, its leading and trailing pin centers are located on the pitch diameter and its trailing outside flanks are in contact with one of said engaging flanks;

a meshing contact angle Tau (τ) is defined between the tangent line and an initial contact reference line that passes through both the controlling pin center and the initial contact location;

a link plate entrance angle Beta (β) is defined between the initial contact reference line and an inside flank reference line that passes through an arc center of the inside flank radius and the initial contact location;

a meshing impact angle Sigma (σ) is defined between the tangent line and the inside flank reference line such that σ=τ+β, and σ is less than or equal to 34°.

2. A chain and sprocket drive system comprising:

a sprocket comprising a plurality of teeth, wherein each tooth comprises an engaging flank and a disengaging flank;

an inverted tooth chain meshed with the sprocket, said inverted tooth chain comprising a plurality of rows of links that each articulate relative to a preceding link row about a leading pin center and that each articulate relative to a following link row about a trailing pin center, wherein said leading and trailing pin centers are spaced from each other at a chain pitch P, each of said rows comprising leading inside flanks and trailing outside flanks, wherein:

the leading inside flanks of each row project outwardly relative to a working portion of the trailing outside flanks of a preceding row and comprise an inside flank radius R;

said chain approaches said sprocket along a tangent line and the engaging flank of each sprocket tooth makes initial meshing contact with said chain at an initial contact location on the leading inside flanks of a meshing row of said chain at an instant of initial meshing contact;

at said instant of initial meshing contact, a chain row immediately preceding the meshing row includes a leading pin center that is located on a pitch diameter of said sprocket so as to be a controlling pin center;

for each row of said chain that is fully meshed with said sprocket, its leading and trailing pin centers are located on the pitch diameter and its trailing outside flanks are in contact with one of said engaging flanks;

a meshing contact angle Tau (τ) is defined between the tangent line and an initial contact reference line that passes through both the controlling pin center and the initial contact location;

a link plate entrance angle Beta (β) is defined between the initial contact reference line and an inside flank reference line that passes through an arc center of the inside flank radius and the initial contact location;

a meshing impact angle Sigma (σ) is defined between the tangent line and the inside flank reference line such that σ=τ+β, and σ is less than or equal to 34';

wherein:

said engaging flank of each sprocket tooth is defined with a pressure angle;

said sprocket defines a tooth count equal to a total number of said teeth and said pressure angle varies according to said tooth count as follows:

if said tooth count is less than 19, said pressure angle=33° if said tooth count is in the range of 19 to 25, said pressure angle=31.5° if said tooth count is in the range of 26 to 60, said pressure angle=30°;

and wherein Beta (β) is less than or equal to 9°.

3. The chain and sprocket drive system as set forth in claim 2, wherein the leading inside flanks of each row project outwardly relative to a working portion of the trailing outside flanks of a preceding row by a maximum projection amount Lamda (λ) such that 0.007×P≤λ≤0.017×P.

4. The chain and sprocket drive system as set forth in claim 3, wherein said flank radius has a magnitude defined such that P≤R<2×P.

5. The chain and sprocket drive system as set forth in claim 4, wherein each of said inside links of said chain defines an outer flank angle ψ≤30.5°, wherein said outer flank angle ψ is defined between a first reference line that includes said trailing pin center and that lies perpendicular to said tangent line and a second reference line that is coincident with said trailing outside flank.

6. The chain and sprocket drive system as set forth in claim 3, wherein said outside flank comprises a non-working portion comprising a chamfer located between the working portion and a toe tip for each of said inside links of said chain, wherein the leading inside flanks of an adjacent row of said chain project outwardly relative to the chamfer by a projection amount that is greater than said projection amount Lamda (λ) when said inverted tooth chain is pulled straight.

7. The chain and sprocket drive system as set forth in claim 6, wherein said working portion of said trailing outside flank and said chamfer are both flat such that a chamfer angle is defined between said chamfer and said trailing outside flank for each of said inside links.

8. A chain and sprocket drive system comprising:

a sprocket comprising a plurality of teeth, wherein each tooth comprises an engaging flank and a disengaging flank;

an inverted tooth chain meshed with the sprocket, said inverted tooth chain comprising a plurality of rows of links that each articulate relative to a preceding link row about a leading pin center and that each articulate relative to a following link row about a trailing pin center, wherein said leading and trailing pin centers are spaced from each other at a chain pitch P, each of said rows comprising leading inside flanks and trailing outside flanks, wherein:

the leading inside flanks of each row project outwardly relative to a working portion of the trailing outside flanks of a preceding row and comprise an inside flank radius R;

said chain approaches said sprocket along a tangent line and the engaging flank of each sprocket tooth makes initial meshing contact with said chain at an initial contact location on the leading inside flanks of a meshing row of said chain at an instant of initial meshing contact;

at said instant of initial meshing contact, a chain row immediately preceding the meshing row includes a leading pin center that is located on a pitch diameter of said sprocket so as to be a controlling pin center;

for each row of said chain that is fully meshed with said sprocket, its leading and trailing pin centers are located on the pitch diameter and its trailing outside flanks are in contact with one of said engaging flanks;

a meshing contact angle Tau (τ) is defined between the tangent line and an initial contact reference line that passes through both the controlling pin center and the initial contact location;

a link plate entrance angle Beta (β) is defined between the initial contact reference line and an inside flank reference line that passes through an arc center of the inside flank radius and the initial contact location;

a meshing impact angle Sigma (σ) is defined between the tangent line and the inside flank reference line such that σ=τ+β, and σ is less than or equal to 34';

wherein said engaging flank of each sprocket tooth is defined with a pressure angle that is at least 27° and not more than 29°.

9. The chain and sprocket drive system as set forth in claim 8, wherein Sigma (σ) is less than or equal to 31°.

10. The chain and sprocket drive system as set forth in claim 9, wherein Beta (β) is less than or equal to 7°.

11. The chain and sprocket drive system as set forth in claim 10, wherein the leading inside flanks of each row project outwardly relative to a working portion of the trailing outside flanks of a preceding row by a maximum projection amount Lamda (λ) such that 0.007×P≤λ≤0.017×P.

12. The chain and sprocket drive system as set forth in claim 11, wherein said flank radius R is defined such that P≤R<2×P.

13. The chain and sprocket drive system as set forth in claim 12, wherein each of said inside links of said chain defines an outer flank angle ψ≤27°, wherein said outer flank angle ψ is defined between a first reference line that includes said trailing pin center and that lies perpendicular to said tangent line and a second reference line that is coincident with said trailing outside flank.

14. The chain and sprocket drive system as set forth in claim 13, wherein said outside flank further comprises a non-working portion including a chamfer that extends between the working portion and a toe tip for each of said links of said chain, wherein the leading inside flanks of an adjacent row of said chain project outwardly relative to the chamfer by a projection amount that is greater than said maximum projection amount Lamda (λ) when said inverted tooth chain is pulled straight.

15. The chain and sprocket drive system as set forth in claim 14, wherein said working portion of said trailing outside flank and said chamfer are both flat such that a chamfer angle is defined between said chamfer and said trailing outside flank for each of said inside links.

16. An inverted tooth chain comprising:
a plurality of rows of links that each articulate relative to a preceding row about a leading pin center and that each articulate relative to a following link row about a trailing pin center, wherein said leading and trailing pin centers are spaced from each other at a chain pitch P, each of said rows comprising leading inside flanks and trailing outside flanks, wherein:
the leading inside flanks of each row project outwardly relative to a working portion of the trailing outside flanks of a preceding row by a maximum projection amount Lamda (λ) such that 0.007×P≤λ≤0.017×P;
the leading inside flanks of each row of said chain are defined by an inside flank radius R, wherein P≤R<2×P;
said outside flank comprises a non-working portion comprising a chamfer located between the working portion and a toe tip for each of said links of said chain, wherein the leading inside flanks of an adjacent row of said chain project outwardly relative to the chamfer by a projection amount that is greater than said projection amount Lamda (λ) when said inverted tooth chain is pulled straight.

17. The inverted tooth chain as set forth in claim 16, wherein said working portion of said trailing outside flank and said chamfer are both flat such that a chamfer angle is defined between said chamfer and said trailing outside flank for each of said links.

18. The inverted tooth chain as set forth in claim 16, wherein said working portion of said trailing outside flank is straight and wherein each link defines an outer flank angle ψ≤30.5°, said outer flank angle ψ defined between: (i) a first reference line that includes said trailing pin center and that lies perpendicular a pin center reference line that connects the leading and trailing pin centers; (ii) a second reference line that is coincident with said working portion of said trailing outside flank.

19. A sprocket adapted to mesh with an inverted tooth chain, said sprocket comprising a plurality of teeth, wherein each tooth comprises an engaging flank and a disengaging flank, wherein said engaging flank of each tooth is defined by a pressure angle PA that varies in magnitude based upon a tooth count N that defines a total number of said teeth included on said sprocket as follows:
N=19 to 25, 28°≤PA≤29°
N=26 to 50, 27°≤PA<28°.

20. The sprocket of claim 19, adapted to mesh with an associated inverted tooth chain comprising a plurality of rows of links that each articulate relative to a preceding link row about a leading pin center and that each articulate relative to a following link row about a trailing pin center, wherein said leading and trailing pin centers are spaced from each other at a chain pitch P, each of said rows comprising leading inside flanks and trailing outside flanks, wherein:
the leading inside flanks of each row project outwardly relative to a working portion of the trailing outside flanks of a preceding row and comprise an inside flank radius R;
said chain approaches said sprocket along a tangent line and the engaging flank of each sprocket tooth makes initial meshing contact with said chain at an initial contact location on the leading inside flanks of a meshing row of said chain at an instant of initial meshing contact;
at said instant of initial meshing contact, a chain row immediately preceding the meshing row includes a leading pin center that is located on a pitch diameter of said sprocket so as to be a controlling pin center;
for each row of said chain that is fully meshed with said sprocket, its leading and trailing pin centers are located on the pitch diameter and its trailing outside flanks are in contact with one of said engaging flanks;
a meshing contact angle Tau (τ) is defined between the tangent line and an initial contact reference line that passes through both the controlling pin center and the initial contact location;
a link plate entrance angle Beta (β) is defined between the initial contact reference line and an inside flank reference line that passes through an arc center of the inside flank radius and the initial contact location;
a meshing impact angle Sigma (σ) is defined between the tangent line and the inside flank reference line such that σ=τ+β, and σ is less than or equal to 31°.

21. An inverted tooth chain comprising:
a plurality of rows of links that each articulate relative to a preceding link row about a leading pin center and that each articulate relative to a following link row about a trailing pin center, wherein said leading and trailing pin centers are spaced from each other at a chain pitch P, each of said rows comprising leading inside flanks and trailing outside flanks, wherein:
the leading inside flanks of each row project outwardly relative to a straight working portion of the trailing outside flanks of a preceding row by a maximum projection amount Lamda (λ) such that 0.007×P≤λ≤0.017×P when said chain is pulled straight;

the leading inside flanks of each row are defined by an inside flank radius R, wherein $P \leq R < 2 \times P$;

said outside flanks of each row comprises a non-working portion comprising a chamfer located between the working portion and a toe tip, wherein the leading inside flanks of an adjacent row of said chain project outwardly relative to the chamfer by a projection amount that is greater than said projection amount Lamda ($\lambda$) when said chain is pulled straight; and, said outside flanks define an outer flank angle $\psi \leq 30.5°$, said outer flank angle $\psi$ defined between: (i) a first reference line that includes said trailing pin center and that lies perpendicular a pin center reference line that connects the leading and trailing pin centers; (ii) a second reference line that is coincident with said straight working portion of said trailing outside flank.

22. The inverted tooth chain of claim 21, wherein said outer flank angle $\psi \leq 27°$.

* * * * *